(12) United States Patent
Uhlig et al.

(10) Patent No.: US 9,383,957 B2
(45) Date of Patent: Jul. 5, 2016

(54) DYNAMIC VARIABLE-CONTENT PUBLISHING

(71) Applicant: Uhlig LLC, Overland Park, KS (US)

(72) Inventors: Mark A. Uhlig, Leawood, KS (US); Kristina M. Hayes, Kansas City, MO (US); Justin B. Hansen, Olathe, KS (US); Arthur S. French, II, Kansas City, MO (US); Lauretta Jo Schultz, Shawnee, KS (US); Amy J. Geisler, Olathe, KS (US)

(73) Assignee: Uhlig LLC, Overland Park, KS (US)

( * ) Notice: Subject to any disclaimer, the term of this patent is extended or adjusted under 35 U.S.C. 154(b) by 394 days.

(21) Appl. No.: 14/071,238

(22) Filed: Nov. 4, 2013

(65) Prior Publication Data

US 2014/0055803 A1 Feb. 27, 2014

Related U.S. Application Data

(63) Continuation of application No. 13/866,934, filed on Apr. 19, 2013, now Pat. No. 8,595,618, which is a continuation of application No. 11/581,870, filed on Oct. 16, 2006, now Pat. No. 8,438,476.

(60) Provisional application No. 60/727,217, filed on Oct. 14, 2005.

(51) Int. Cl.
G06F 17/22 (2006.01)
G06F 3/12 (2006.01)
(Continued)

(52) U.S. Cl.
CPC ............ G06F 3/1297 (2013.01); G06F 17/212 (2013.01); G06F 17/227 (2013.01);
(Continued)

(58) Field of Classification Search
CPC .................................................. G06F 17/2247
USPC .......................................................... 715/234
See application file for complete search history.

(56) References Cited

U.S. PATENT DOCUMENTS

| 5,241,464 A | 8/1993 | Greulich et al. |
| 5,493,490 A | 2/1996 | Johnson |

(Continued)

FOREIGN PATENT DOCUMENTS

| GB | 2407676 A | 5/2005 |
| WO | WO 98/08176 | 2/1998 |

OTHER PUBLICATIONS

Lee, Kyong-Ho, Nicholas Guttenberg, and Victor McCrary. "Standardization aspects of eBook content formats." Computer Standards & Interfaces 24, No. 3 (2002): 227-239.*

(Continued)

*Primary Examiner* — Frank D Mills
(74) *Attorney, Agent, or Firm* — Fenwick & West LLP

(57) ABSTRACT

A product creator system includes a business application and a distribution utility. The business application enables a user to specify and/or edit (via a user client) a document. The business application generates a packet that is transmitted to the distribution utility. The packet describes the document, such as a document of a particular type (where the document is based on variable content and/or variable layout), and a distribution method for the document. Distribution methods include print, ship, mail, fax, email, and save. The distribution utility generates and distributes the document (via an output device) based on the packet. The business application, which can be used with a variety of distribution utilities, includes a web front-end and a packet generator. The distribution utility, which can be used with a variety of business applications, includes control logic and a document processor. The document processor helps generate the document.

19 Claims, 16 Drawing Sheets

(51) Int. Cl.
  *G06F 17/21* (2006.01)
  *G06F 17/24* (2006.01)
  *G06F 17/30* (2006.01)
  *G06K 15/02* (2006.01)

(52) U.S. Cl.
  CPC .......... *G06F17/2247* (2013.01); *G06F 17/248* (2013.01); *G06F 17/30011* (2013.01); *G06K 15/181* (2013.01)

(56) References Cited

U.S. PATENT DOCUMENTS

| | | | |
|---|---|---|---|
| 5,615,342 | A | 3/1997 | Johnson |
| 5,963,968 | A | 10/1999 | Warmus et al. |
| 6,088,710 | A | 7/2000 | Dreyer et al. |
| 6,167,382 | A | 12/2000 | Sparks et al. |
| 6,205,452 | B1 | 3/2001 | Warmus et al. |
| 6,243,172 | B1 | 6/2001 | Gauthier et al. |
| 6,327,599 | B1 | 12/2001 | Warmus et al. |
| 6,332,149 | B1 | 12/2001 | Warmus et al. |
| 6,446,100 | B1 | 9/2002 | Warmus et al. |
| 6,462,756 | B1 | 10/2002 | Hansen et al. |
| 6,509,974 | B1 | 1/2003 | Hansen |
| 6,631,375 | B2 | 10/2003 | Jecha et al. |
| 6,632,251 | B1 | 10/2003 | Rutten et al. |
| 6,704,120 | B1 | 3/2004 | Leone, III et al. |
| 6,826,727 | B1 | 11/2004 | Mohr et al. |
| 6,844,940 | B2 | 1/2005 | Warmus et al. |
| 6,952,801 | B2 | 10/2005 | Warmus et al. |
| 6,992,786 | B1 | 1/2006 | Breding et al. |
| 7,340,676 | B2 | 3/2008 | Geig |
| 7,451,140 | B2 | 11/2008 | Purvis et al. |
| 7,471,401 | B2 | 12/2008 | Saito |
| 7,548,881 | B2 | 6/2009 | Narayan et al. |
| 8,438,476 | B2 | 5/2013 | Uhlig et al. |
| 8,595,618 | B2 | 11/2013 | Uhlig et al. |
| 8,661,338 | B2 | 2/2014 | Purvis et al. |
| 2002/0111963 | A1 | 8/2002 | Gebert et al. |
| 2002/0116421 | A1* | 8/2002 | Fox .......................... G06F 17/21 715/201 |
| 2002/0152215 | A1* | 10/2002 | Clark ....................... G06F 21/10 |
| 2003/0220905 | A1* | 11/2003 | Amado .................... G06F 17/24 |
| 2004/0001217 | A1 | 1/2004 | Wu |
| 2004/0061897 | A1 | 4/2004 | Onishi |
| 2004/0088647 | A1* | 5/2004 | Miller .................... G06F 17/243 715/234 |
| 2004/0177316 | A1 | 9/2004 | Layzell et al. |
| 2004/0205568 | A1* | 10/2004 | Breuel .................. G06F 17/211 715/205 |
| 2005/0063010 | A1 | 3/2005 | Giannetti |
| 2005/0122542 | A1 | 6/2005 | Gimenez et al. |
| 2005/0125724 | A1 | 6/2005 | Peiro et al. |
| 2005/0157341 | A1* | 7/2005 | Levine ................... G06F 17/243 358/1.18 |
| 2005/0251740 | A1* | 11/2005 | Shur ...................... G06F 17/217 715/251 |
| 2005/0273701 | A1* | 12/2005 | Emerson ............... G06F 17/218 715/234 |
| 2005/0289461 | A1 | 12/2005 | Amado et al. |
| 2006/0005116 | A1* | 1/2006 | Ferguson .............. G06F 17/248 715/234 |
| 2006/0026512 | A1* | 2/2006 | Hays ..................... G06F 17/217 715/251 |
| 2006/0075338 | A1* | 4/2006 | Kusakabe ............. G06F 3/1204 715/255 |
| 2006/0114490 | A1 | 6/2006 | Rolleston |
| 2006/0132816 | A1* | 6/2006 | Yamamoto ................ B41J 3/44 358/1.13 |
| 2008/0126936 | A1 | 5/2008 | Williams |

OTHER PUBLICATIONS

Murray, Caroline, Indexing in an XML context, Oct. 2004, The Indexer, vol. 24 No. 2, pp. 6 and 67.

Prosi, Rainer, JDF Technical Overview, Aug. 31, 2000, Seybold SF2000, Slides 1-43.
ISIS Marketing GmbH, "The Papyrus Document System," 2006, [online] [Retrieved on Jan. 7, 2007] Retrieved from the Internet <URL: http://www.isis-papyrus.com/e/pp./1/2/conceptprint.html>.
ISIS Papyrus, "Papyrus Designer 6," Jan. 1, 2006, [online] [Retrieved on Jan. 7, 2007] Retrieved from the Internet <URL: http://www.isis-papyrus.com/e/pages/productsheets/pdf/Papyrus61E/0304PapyrusDesigner61E.pdf>.
ISIS Papyrus, "Papyrus DocEXEC 6," Jan. 1, 2006, [online] [Retrieved on Jan. 7, 2007] Retrieved from the Internet <URL: http://www.isis-papyrus.com/e/pages/productsheets/pdf/Papyrus61E/0506PapyrusDocEXEC61E.pdf>.
ISIS Papyrus, "Papyrus Document System 6," Jan. 1, 2006, [online] [Retrieved on Jan. 7, 2007] Retrieved from the Internet <URL: http://www.isis-papyrus.com/e/pages/productsheets/pdf/Papyrus61E/0102PapyrusSystem61E.pdf>.
Karrman, J., "html2ps," Mar. 3, 2005, [online] [Retrieved on Jan. 7, 2007] Retrieved from the Internet <URL: http://user.it.uu.se/.about.jan/html2ps.html>.
Lowagie, B., "iText Library Info," 2006, [online] [Retrieved on Jan. 7, 2007] Retrieved from the Internet <URL: http://itext.ugent.be/library/>.
Xerox Corporation, "VIPP IDE (Interactive Development Environment)," 2007, [online] [Retrieved on Jan. 7, 2007] Retrieved from the Internet <URL: http://www.xerox.com/go/xridequipment/product_details.jsp?prodID=VIPP_IDE&Xcntry=GBR&Xlang=en_GB&tab=Overview&view=printable>.
Xerox Corporation, "Xerox Introduces VIPP Tools," Sep. 1999, [online] [Retrieved on Jan. 7, 2007] Retrieved from the Internet <URL: http://a1851.g.akamaitech.n. et/f/1851/2996/24h/cacheA.xerox.com/downloads-/usa/en/v/vtoolsbr.pdf>.
Adler, S. et al., "Extensible Stylesheet Language (XSL) Version 1.0 (W3C Recommendation), Chapter 6: Formatting Objects, Section 6.1: Introduction to Formatting Objects," Oct. 15, 2001, [online] [Retrieved Nov. 14, 2006] Retrieved from the Internet <URL: http://www.w3.org/TR/xsl/slice6.html>.
AssociationVoice, "Features," 2006, [online] [Retrieved Nov. 14, 2006] Retrieved from the Internet <URL: http://www.homeowners-association-software.com/Homeowners-associations-management-software-features.about.59.about.61.htm>.
Bitstream Inc., "Pageflex Persona Cross Media Suite," Oct. 2006, [online] [Retrieved Nov. 14, 2006] Retrieved from the Internet <URL: http://www.bitstream.com/publishing/pdfs/10-06-persona-single.pdf>.
Borning, A. et al., "Constraint-Based Document Layout for the Web," Multimedia Systems, vol. 8, No. 3, pp. 177-189, 2000.
CAP Ventures, "The New Corporate Print Customer: A Profile of a Market in Transition (Brochure)," Jul. 2003, [online] [Retrieved Nov. 14, 2006] Retrieved from the Internet <URL: http://www.infotrends.com/public/Content/Multiclients/Brochures/corpprint-customer.pdf>.
CAP Ventures, "The New Corporate Print Customer: A Profile of a Market in Transition (Table of Contents)," Jul. 2003, [online] [Retrieved Nov. 14, 2006] Retrieved from the Internet <URL: http://www.infotrends.com/public/Content/Multiclients/Brochures/corpprint-customertoc.pdf>.
Document Sciences Corporation, "xPression (Technical Specification)," Sep. 2006, [online] [Retrieved Nov. 14, 2006] Retrieved from the Internet <URL: http://www.docscience.com/downloads/xpression/ONXTS001-xpression-ts-usltr.pdf>.
Geigel, J. et al., "Automatic Page Layout Using Genetic Algorithms for Electronic Albuming," Proceedings: Electronic Imaging, San Jose, CA, Jan. 21-26, 2001, SPIE (The International Society for Optical Engineering), vol. 4311, pp. 79-90.
Goldenberg, E., "Automatic Layout of Variable-Content Print Data," M.Sc. Thesis, School of Cognitive & Computing Sciences, University of Sussex, Brighton, UK, Aug. 2002.
Grahn, K-J, "Catalogue Production Automation—Case Studies," M.Sc. Thesis, School of Computer Science and Communication, KTH (Royal Institute of Technology), Stockholm, Sweden, 2006.

(56) References Cited

OTHER PUBLICATIONS

Harrington, S. et al., "Aesthetic Measures for Automated Document Layout," ACM Symposium on Document Engineering (DocEng), Milwaukee, WI, Oct. 28-30, 2004.

InfoTrends/CAP Ventures, "The Global Print Production Workflow Market: Enabling Fundamental Business Change in Graphic Arts (Brochure)," 2004, [online] [Retrieved Nov. 14, 2006] Retrieved from the Internet <URL: http://www.capv.com/eprise/main/Home/Multiclient/Brochures/ProdSoft.pdf>.

InfoTrends/CAP Ventures, "The Global Print Production Workflow Market: Enabling Fundamental Business Change in Graphic Arts (Table of Contents)," Dec. 2004, [online] [Retrieved Nov. 14, 2006] Retrieved from the Internet <URL: http://www.infotrends.com/public/Content/Multiclients/Brochures/pwsoftwaretoc.pdf>.

InfoTrends/CAP Ventures, "Production Workflow Solutions Product Compendium: Variable Data Design and Production Software (Abstract)," Mar. 2005, [online] [Retrieved Nov. 14, 2006] Retrieved from the Internet <URL: http://www.capv.com/eprise/main/Store/pdf/VDPcompendium.pdf>.

Parametric Technology Corporation, "Arbortext," 2006, [online] [Retrieved Nov. 16, 2006] Retrieved from the Internet <URL: http://www.ptc.com/appserver/mkt/products/home.jsp?k=3591>.

Printable Technologies, "FusionPro Desktop (Datasheet)," Oct. 2006, [online] [Retrieved Nov. 14, 2006] Retrieved from the Internet <URL: http://printable.com/datasheets/datasheet_pti_fpDesktop.pdf>.

Printable Technologies, "FusionPro Server (Datasheet)," Aug. 2006, [online] [Retrieved Nov. 14, 2006] Retrieved from the Internet <URL: http://printable.com/datasheets/datasheet_pti_fpServer.pdf>.

Printable Technologies, "FusionPro Web (Datasheet)," Aug. 2006, [online] [Retrieved Nov. 14, 2006] Retrieved from the Internet <URL: http://printable.com/datasheets/datasheet_pti_fpWeb.pdf>.

Purvis, L. et al., "Creating Personalized Documents: An Optimization Approach," ACM Symposium on Document Engineering (DocEng), Grenoble, France, Nov. 20-22, 2003.

RedTitan Technology Limited, "Products," 2004, [online] [Retrieved Nov. 14, 2006] Retrieved from the Internet <URL: http://www.redtitan.com/products.htm>.

RenderX, Inc., "Products," 2005, [online] [Retrieved Nov. 14, 2006] Retrieved from the Internet <URL: http://www.renderx.com/tools/index.html>.

XyEnterprise Inc., "Products," 2006, [online] [Retrieved Nov. 14, 2006] Retrieved from the Internet <URL: http://www.xyenterprise.com/products/>.

PCT International Search Report and Written Opinion, PCT/US06/40571, Dec. 4, 2007, 9 pages.

Anonymous, "Variable Data Printing," Sep. 22, 2005, pp. 1-28, XP002616224, [Online] [Retrieved on Jan. 11, 2011] Retrieved from the Internet: <URL: http://download.support.xerox.com/pub/docs/XRIP_EFI_EXP4110/userdocs/any-os/en/PrintVariableData.pdf>.

Archive of Anonymous, "Big, Fat, Stinking Software," [Online], pp. 1-4, XP002616226. [Archived by http://archive.org on Aug. 30, 2005; Retrieved on Jan. 11, 2011] Retrieved from the Internet: <URL: http://web.archive.org/web/20050830050845/http://home.comcast.net/.about.jeff.ulicny/software/utils.html>.

Extended European Search Report, European Application No. 06826117.1, Jan. 27, 2011, 11 pages.

Fraker, J. et al. "need creep advise . . . " Sep. 10, 2005, pp. 1-3, XP002616225, [Online] [Retrieved on Jan. 11, 2011] Retrieved from the Internet: <URL: http://www.graphicdesignforum.com/forum/archive/index.php/t-10735.html>.

Gimenez, G. et al., "A PPML/T Based Variable Data Printing Engine," NIP20: International Conference on Digital Printing Technologies, Oct. 2004, pp. 2-5, XP002616227, [Online] [Retrieved on Jan. 11, 2011] Retrieved from the Internet: <URL: http://www.ece.uci.edu/.about.gimenezg/>.

European Examination Report, European Application No. 06826117.1, Mar. 29, 2012, 5 pages.

United States Advisory Action, U.S. Appl. No. 11/581,870, Jul. 12, 2010, 5 pages.

United States Office Action, U.S. Appl. No. 11/581,870, Apr. 14, 2010, 15 pages.

United States Office Action, U.S. Appl. No. 11/581,870, Oct. 6, 2009, 13 pages.

Canadian Office Action, Canadian Application No. 2,625,816, Dec. 23, 2013, 3 pages.

\* cited by examiner

FIG. 6C

DYNAMIC VARIABLE-CONTENT PUBLISHING

CROSS-REFERENCE TO RELATED APPLICATIONS

This application is a continuation of U.S. patent application Ser. No. 13/866,934, filed Apr. 19, 2013, entitled "Dynamic Variable-Content Publishing" which is a continuation of U.S. patent application Ser. No. 11/581,870, filed Oct. 16, 2006, entitled "Dynamic Variable-Content Publishing" which claims the benefit of U.S. Provisional Patent Application No. 60/727,217, filed Oct. 14, 2005, entitled "Online Method for Creation of a Publication", all of which are hereby incorporated by reference.

BACKGROUND OF THE INVENTION

1. Field of the Invention

The present invention relates to creating different types of documents which can be distributed in different ways. More particularly, the present invention relates to a system that can be used to create and distribute different types of documents that are based on variable content and/or variable layout.

2. Description of Background Art

A document is defined by two principal characteristics: content and layout. Content can include the broadest possible spectrum of text, numerical data, artwork, images, graphics, and symbols. Layout is generally defined as the spatial arrangement of content on a two-dimensional surface (such as a page). This two-dimensional surface can itself be arranged together with other such surfaces as part of a set of pages (such as a magazine or book). Page sets can be further arranged into sets of page sets (such as volumes), possibly including additional dependent elements such as covers, tables of contents, and indexes.

Traditionally, content and layout have been specified manually. A writer or artist created content, and a graphic designer or paste-up artist arranged the content into a page layout (also known as formatting). Recently, software has been created to help people perform some of these tasks. For example, writers can use word processing programs such as Microsoft Word, and artists can use graphics programs such as Adobe Illustrator, in order to create content. Graphic designers and paste-up artists use page make-up software such as Adobe InDesign to manually create layouts.

Notwithstanding the incremental improvements in efficiency offered by these software tools, the process of creating and formatting documents has remained essentially a manual process, relying on the skill and judgment of a human operator. Even when a document requires a change in only one of the two principal characteristics (e.g., new content within a fixed layout or fixed content within a new layout), existing software offers little or no support. When both characteristics change, human intervention is required, which severely restricts the speed, efficiency, and scale with which complex customized documents can be created.

While some software applications support the mixing and matching of content and layout to produce rudimentary substitution of content, such as the merging of mailing addresses or the replacement of account data in billing statements, these applications are highly specialized and support neither highly-variable content nor highly-variable layout. Each layout must be used with a particular number of content objects, and the content objects must be of a particular size and/or shape.

Because current methods—even those based on software—are so heavily dependent on human intervention and control, the potential for integrating simultaneous streams of diverse content from multiple sources and making complex layout choices is necessarily constrained by the limits of human ability. In addition, given the difficulty of monitoring and controlling human input on a comprehensive or systematic basis, the reliance of current methods on human intervention dramatically complicates and increases the cost of supervising production and ensuring quality in large-scale production of customized documents.

What is needed is a document creation system that can define the content and/or layout of a document automatically based on rules or algorithms with little or no user input, interaction, or intervention. With such a system, a layout would be dynamically defined for each document based on the content that was selected (and possibly also based on some high-level design decisions). The system would replace the artistic, aesthetic, and subjective tasks currently performed by people. Since these tasks are not mechanical, it is very difficult to automate them. However, the successful development of such a system would yield a broad range of economic and social benefits.

SUMMARY OF THE INVENTION

Systems, methods, and computer program products are presented for creating a document of a particular type, where the document is based on variable content and/or variable layout. In one embodiment, the system includes a business application and a distribution utility. The business application is configured to receive information, wherein the information specifies document content and document layout, and to generate, based on the received information, eXtensible Markup Language (XML) code that describes the document. The distribution utility is configured to receive the XML code and to generate, based on the received code, the document.

A first business application provides a user interface that enables a user to specify and/or edit (via a user client) a magazine and a method of distribution. The first business application also provides user interfaces for viewing production status and account information and for managing production status and account information.

A second business application provides a user interface that enables a user to place an order for resale documents (documents required for the transfer, sale, and/or purchase of a residential home), pay for the order, and track the status of the order. The second business application also provides user interfaces for managing and monitoring the system and for creating and configuring resale document formats, adding new data to include in the resale documents, and managing production status or account information.

A third business application provides a user interface that enables a user to create notices (such as cyclical notices that are statutorily required to be distributed to occupants of units in some communities in certain municipalities), pay for the notices, and track the status of the notices. The third business application also provides a user interface for creating notice formats, adding new data to include in the notices, and managing production status or account information.

BRIEF DESCRIPTION OF THE DRAWINGS

The invention is illustrated by way of example, and not by way of limitation, in the figures of the accompanying drawings in which like reference numerals refer to similar elements.

Figure 6C:
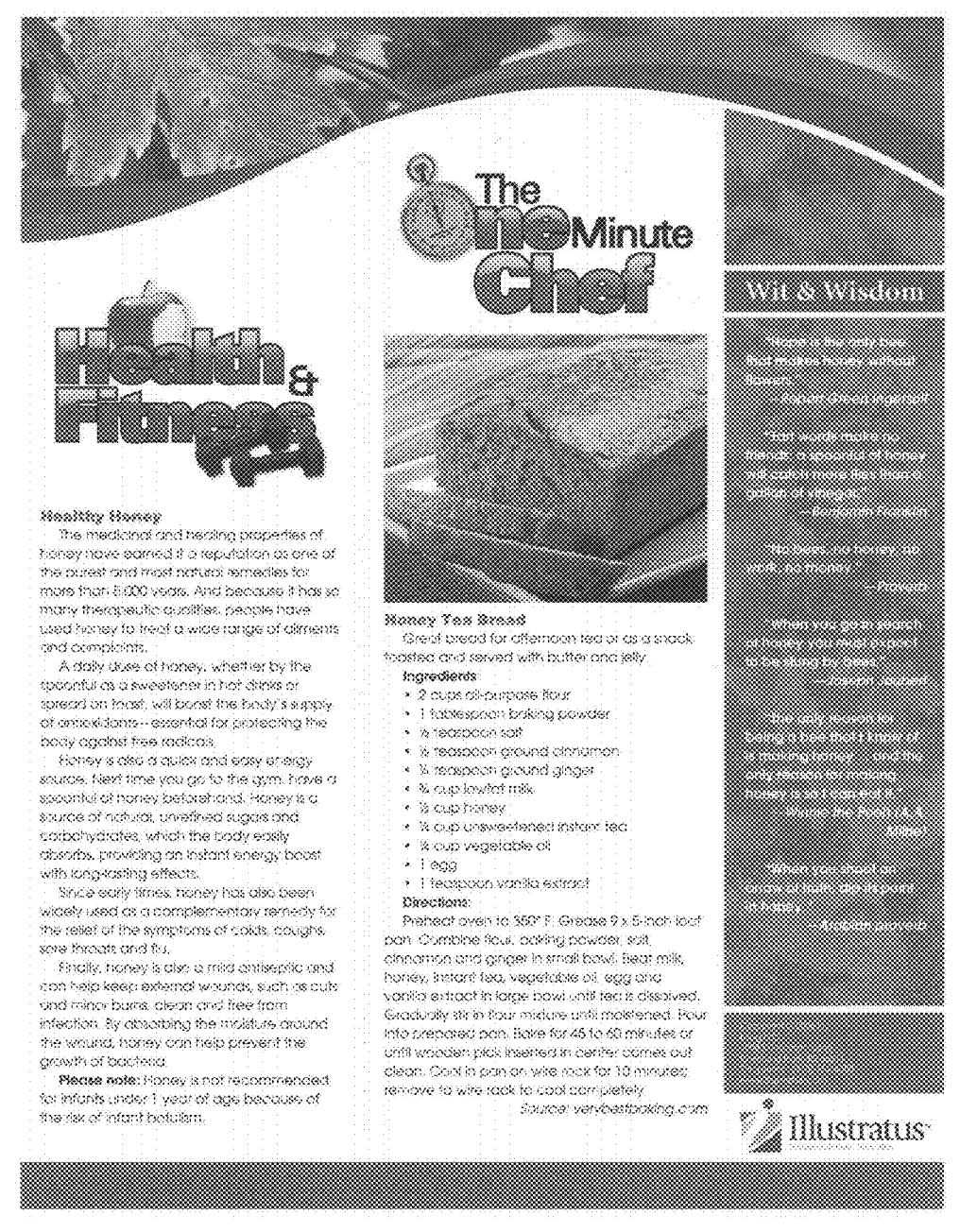

FIGS. 6A-6D each illustrate one page of a newsletter, according to one embodiment of the invention.

DETAILED DESCRIPTION OF THE EMBODIMENTS

Figure 1:
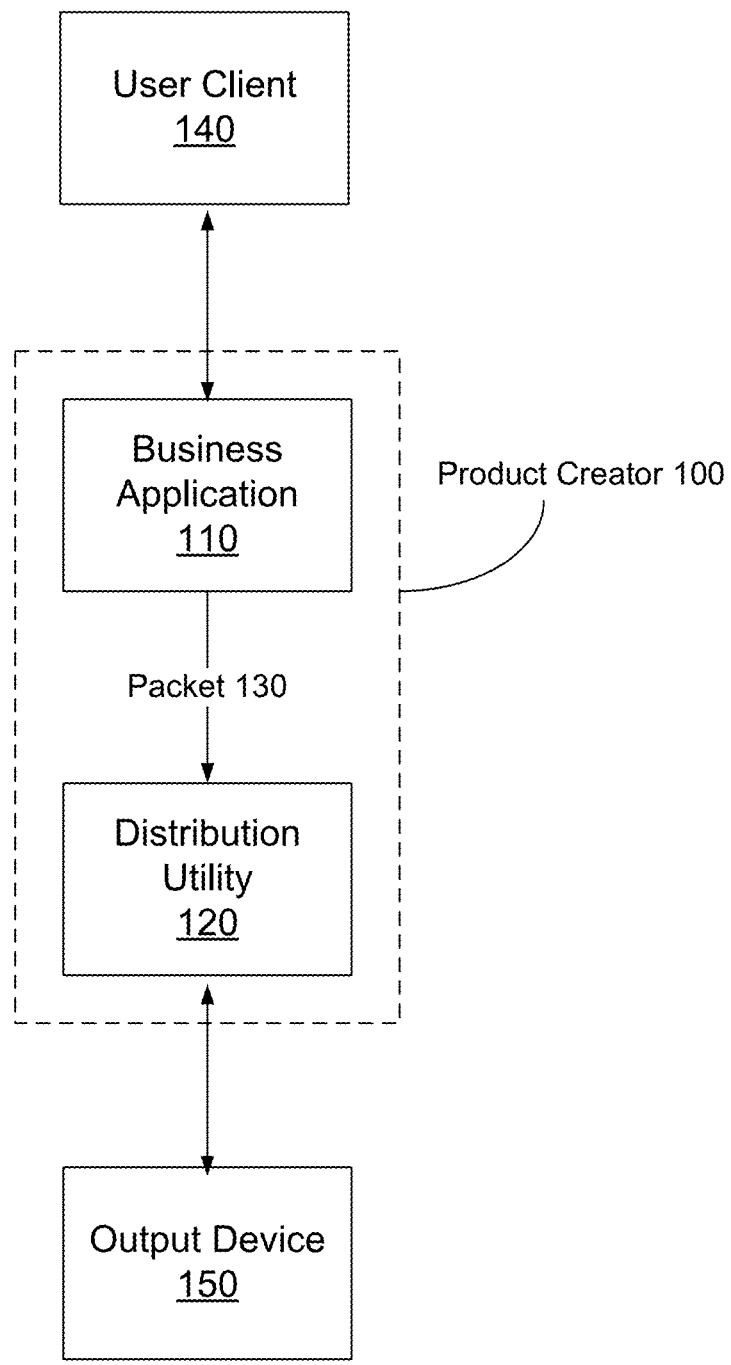
FIG. 1 illustrates a diagram of a product creator, according to one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages can be used to implement the teachings of the invention as described herein.

1. Creation of Different Types of Documents that can be Distributed in Different Ways A system called a "product creator" is used to create and distribute different types of documents, such as different types documents that are based on variable content and/or variable layout. As used herein, the term "document" refers generally to any type of publication in any form, including (but not limited to) a piece of written, printed, or electronic matter that provides information or evidence; anything serving as a representation of a person's thinking by means of symbolic marks; writing that provides information (including information of an official nature); a formal piece of writing that provides information or acts as a record of events or arrangements; a writing conveying information; or a paper or set of papers with written or printed information, including of an official type.

Examples of a document include, but are not limited to, a magazine, newsletter, book, folder, letter, certificate, report, brochure, pamphlet, booklet, leaflet, catalog, publication, periodical, prospectus, circular, guide, handbook, workbook, manual, journal, register, volume, page(s), directory, declaration, manuscript, script, contract, testament, record, chart, dossier, material, questionnaire, query, survey, research, newssheet, communication, discourse, interview, narrative, tract, treatise, album, concordance, tome, epic, paperback, log, primer, textbook, annual, ledger, posting, spreadsheet, account, index, library, collection, series, print, edition, issue, tabloid, proof, composition, galley, layout, conveyance, instrument, and review.

In one embodiment, a product creator 100 is used to create and distribute the following types of documents: magazines, resale documents, and annual notices. In other embodiments, the product creator 100 is used to create and distribute other types of documents.

A product creator 100 can create documents that are based on highly-variable content and/or highly-variable layout. For example, not only can the content on a page vary, but the number of pages in a book or volume and the number of books or volumes in a boxed set can also vary.

In one embodiment, the product creator 100 uses algorithms or rules during various parts of the publishing process to substantially digitize and/or automate the process. For example, the creation and distribution of a document is generally accomplished by a team of people such as content creators, editors, customers (who ultimately purchase the document), and publishing supervisors. Since the document is generated algorithmically, it is embodied in electronic form. This means that a document can be accessed from various locations by various people over a network. Also, a person's access to a document can be restricted or customized based on her role in the publishing process.

In one embodiment, audit trails and/or archives are incorporated into the publishing process, including creation and/or distribution. Since the publishing process is electronic, logs can be automatically generated that reflect publishing operation and status. Documents that are created can be archived and searched. Real-time reports and alerts can be generated and sent to users or other software applications. Accounting can also be integrated into the publishing process.

FIG. 1 illustrates a diagram of a product creator, according to one embodiment of the invention. In the illustrated embodiment, the product creator 100 includes a business application 110 and a distribution utility 120 that are communicatively coupled. FIG. 1 also includes a user client 140 and an output device 150. The user client 140 is communicatively coupled to the business application 110 (e.g., via a network such as the Internet or some other network that is public or private, hardwired or wireless). The output device 150 is communicatively coupled to the distribution utility 120. In one embodiment, the business application 110, distribution utility 120, user client 140, and output device 150 are each located in different places and/or executed on different machines. In another embodiment, two or more of these elements are located in the same place and/or executed on the same machine.

The business application 110 enables a user to specify and/or edit (via the user client 140) a document that is based on variable content and/or variable layout. In one embodiment, the document is of a particular type, such as a magazine, resale document, or annual notice. In this embodiment, a business application 110 is configured to work with a document of a particular type. For example, consider three different business applications 110: one for working with magazines, one for working with resale documents, and one for working with annual notices. Any one of these business applications 110 can be used in the product creator 100. In one embodiment, the business application 110 enables a user to specify and/or edit (via the user client 140) a distribution method for the document.

The distribution utility 120 generates and distributes a document that is based on variable content and/or variable layout. In one embodiment, several methods of distribution are available, including print, ship, mail, fax, email, and save. In this embodiment, a distribution utility 120 is configured to distribute a document using a particular method. For example, consider six different distribution utilities 120: one for distribution via print, one for distribution via ship, one for distribution via mail, one for distribution via fax, one for distribution via email, and one for distribution via save. Any one of these distribution utilities 120 can be used in the product creator 100. Also, additional distribution utilities 120 are possible as known to those of ordinary skill in the art. For example, an electronic version of a document can be converted into a web page, saved onto a disk and mailed (e.g., a CD-ROM), or included within a web log or web feed (e.g., a web feed according to the Really Simple Syndication (RSS) file format). Other distribution utilities 120 can use new technologies as the technologies are created.

The interchangeability of business applications 110 and distribution utilities 120 means that the product creator model can be used to create many different types of products, where a product is a combination of a business application 110 and a distribution utility 120. For example, the combination of three types of business applications 110 and six types of distribution utilities 120 yields 18 different types of products. Each of these business applications 110 and distribution utilities 120 will be described below.

The user client 140 comprises a software application or device that enables a user to communicate with the business application 110. In one embodiment, the user client 140 comprises a software application that enables a user to browse the World Wide Web, such as Internet Explorer (from Microsoft Corporation of Redmond, Wash.), Safari (from Apple Computer, Inc. of Cupertino, Calif.), Firefox (from Mozilla Corporation of Mountain View, Calif.), or Netscape Browser (from AOL LLC of Dulles, Va.). The web browser is run on any suitable device, such as a desktop computer, laptop computer, personal digital assistant (PDA), or telephone. Although FIG. 1 includes only one user client 140, any number of user clients 140 can be communicatively coupled to the business application 110.

The output device 150 comprises a software application or physical entity that enables a document to be distributed. Different output devices 150 are useful for different distribution methods. For example, a printer is useful for a print distribution method, while an email server is useful for an email distribution method. Although FIG. 1 includes only one output device 150, any number of output devices 150 can be communicatively coupled to the distribution utility 120. Multiple output devices 150 are useful, for example, if a deliverable document includes components that are generated by different output devices 150 (e.g., a folder from one device and inner pages from another device). Output devices 150 will be discussed below.

The business application 110 generates a packet 130 that is transmitted to the distribution utility 120. The distribution utility 120 generates the document based on the packet 130. A packet 130 is a collection of information. The packet 130 can be in any format, such as a file or a stream. The information in the packet 130 describes a deliverable document, such as a particular document of a particular type, where the document is based on variable content and/or variable layout. In one embodiment, the packet 130 includes data that represents text that is formatted using eXtensible Markup Language (XML). The portion of the packet 130 that describes the document is referred to as the document portion. In one embodiment, the packet 130 also describes a distribution method for the document. In this embodiment, the portion of the packet 130 that describes the distribution method is referred to as the distribution portion.

The distribution utility 120 distributes a document according to distribution instructions. In one embodiment, these instructions are present in the packet 130 (specifically, in the distribution portion of the packet 130). In another embodiment, these instructions are stored elsewhere and accessed by the distribution utility 120. For example, the business application 110 saves the instructions to memory where they can be accessed by the distribution utility 120. The remainder of this document will assume that a packet 130 includes a distribution portion. However, it is also possible for distribution instructions to be located elsewhere.

In one embodiment, the business application 110 enables a user to specify and/or edit (via the user client 140) a distribution method for a document. In another embodiment, a distribution method is specified automatically without user input.

2. Distribution Utility

As described above, a business application 110 generates a packet 130 that is transmitted to a distribution utility 120. The distribution utility 120 generates and distributes a deliverable document based on the packet 130.

Figure 2:
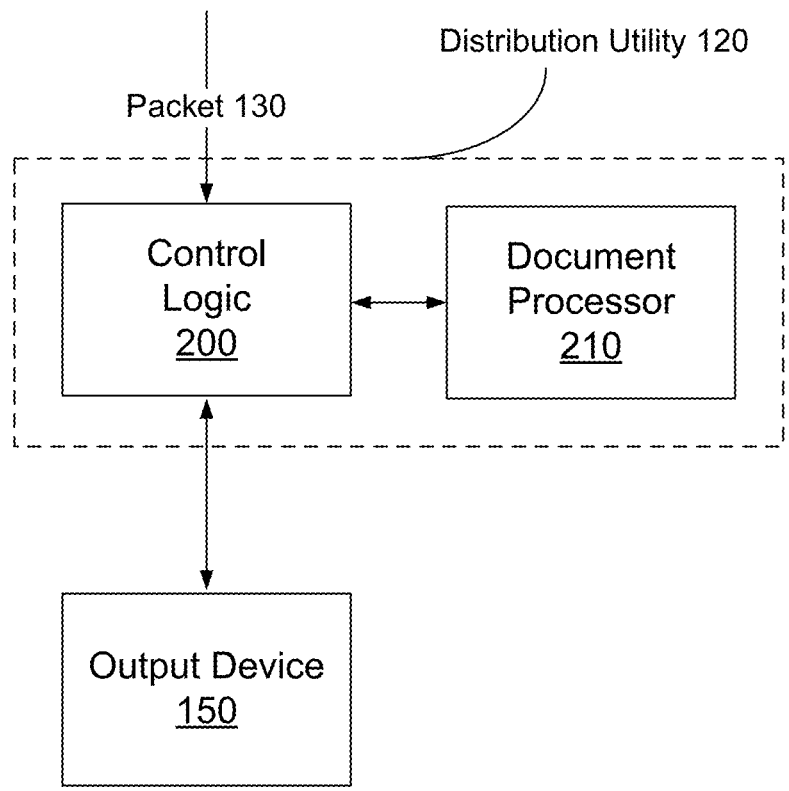
FIG. 2 illustrates a diagram of a distribution utility, according to one embodiment of the invention.

FIG. 2 illustrates a diagram of a distribution utility, according to one embodiment of the invention. In the illustrated embodiment, the distribution utility 120 includes control logic 200 and a document processor 210. The control logic 200 is communicatively coupled to the document processor 210. The document processor 210 provides various types of functionality for processing a packet 130 (specifically, the document portion of the packet 130). The control logic 200 generates and distributes a deliverable document using the document processor 210.

FIG. 2 also shows a packet 130 and an output device 150. These elements were described with reference to FIG. 1. The packet 130 is input to the control logic 200. The output device 150 is communicatively coupled to the control logic 200.

A. Packet

The document portion of a packet 130 describes a document, including both the document's content and the document's layout. In one embodiment, the document portion is written in a new, proprietary markup language called Variable Print Markup Language (VPML). VPML is similar to HTML but changes some of the HTML attributes and values and extends HTML by adding some new elements ("tags"). In one embodiment, a new element is included within a CDATA (character data) section, as described in Standard Generalized Markup Language (SGML). VPML code can refer to external files, including an image or a page within a PDF or PostScript document.

In another embodiment, VPML can be used in conjunction with styles, similar to HTML. A style describes how document content should be presented, such as which colors, fonts, and layouts to use. A style is defined within VPML code or within a VPML element (e.g., using the "style" attribute) or in a separate stylesheet that is referenced by VPML code. In one embodiment, a stylesheet is written in a language that is similar to the Cascading Style Sheets (CSS) language but also includes some changes and extensions.

Appendix A includes a description of VPML, including new, proprietary elements and selected HTML elements. Appendix A also includes a description of styles, including new, proprietary properties and values and selected CSS properties and values. VPML will be further described below in conjunction with the document processor 210.

The distribution portion of a packet 130 includes information regarding how a document should be rendered and/or distributed, such as the method of distribution and any data that is needed to perform the distribution. In one embodiment, the methods of distribution and their accompanying data are as follows:

Print distribution—A tangible copy of the document is produced. The document is distributed manually (e.g., by a customer picking it up from a publisher). In one embodiment, a packet 130 that specifies print as a method of distribution is referred to as a "job," since "job" commonly refers to something that has been sent to be printed. Accompanying data includes identification of a queue (see below) that should be used to process a job in order to produce a document. In one embodiment, accompanying data includes instructions regarding triggering alerts during a job's lifecycle.

A queue is responsible for processing a job throughout its lifecycle, from acceptance through production (processing) to completion. Processing includes converting content defined in the job (specifically, in the job's document portion) into a print product (such as PostScript code; e.g., PostScript® 3™, from Adobe Systems Incorporated of San Jose, Calif.) that can be rendered by an output device 150. A queue can process jobs alone or in batches. A queue is generally created for producing a particular type of document (e.g., a magazine). In one embodiment, a queue is defined and/or configured by XML code.

An output device 150 can be, for example, a physical entity or a software application. In one embodiment, an output device 150 includes one of the following: a printer, a distiller, and a decomposition service. Communication with an output device 150 can take many different forms, such as Line Printer Remote (LPR) protocol, telnet, a batch file, and a watched-folder printing utility (such as Batch & Print Pro 2.04 from Traction Software Limited of the United Kingdom).

A printer can be, for example, a NexPress 2100 (from Kodak of Rochester, N.Y.), an iGen3® digital production press (from Xerox Corporation of Stamford, Conn.), an Indigo press (from Hewlett-Packard Company of Palo Alto, Calif.), a DocuTech™ 6100 production publisher (Xerox), a DocuPrint™ N4525 network laser printer (Xerox), a Nuvera 120 (Xerox), a DigiMaster (Kodak), an imageRUNNER 125 or 400 (from Canon USA, Inc., of Lake Success, N.Y.), a 4110 (Xerox), a DocuColor 4525 (Xerox), a CLC 5100 (Canon), a WorkCentre® Pro 90 advanced multifunction system (Xerox) or any printing device that is compatible with the PostScript page description language.

Depending on the particular file formats and printers concerned, it may be useful to use a distiller and/or decomposition service. A distiller, such as Adobe's Acrobat Distiller, accepts a file written in PostScript and converts it into a file written in Portable Document Format (PDF) (from Adobe Systems Incorporated of San Jose, Calif.). Decomposition is translation of a file written in a page description language (PDL). Decomposition, which is performed by a printer, can be very time-consuming if the file is complex. A decomposition service, such as the Decomposition Service within the DocuPrint Network Printer Series (NPS)/IPDS Printer Series (IPS) software (from Xerox Corporation of Stamford, Conn.), decomposes a document once and then stores it as a "form." This form, which is in Tagged Image File Format (TIFF), can be printed twice to five times faster than the original document can be printed.

In print distribution, output devices 150 modify (e.g., print on) various kinds of physical, hard copy materials (plain, glossy, transparent, etc.) to produce the deliverable document. In one embodiment, these materials are subjected to various finishing processes such as cutting, folding, boxing, and labeling. The materials can be used in different ways to organize and assemble the deliverable document (e.g., box, book cover and contents, folder cover and contents, booklet, and label). In one embodiment, instructions regarding how to "finish" a job are included in one or more job tickets. A job ticket can include a barcode that, once scanned, indicates that the instructions on the job ticket have been performed successfully. In this way, the status of the finishing process can be tracked.

Ship distribution—Multiple tangible copies of one document or tangible copies of multiple documents are produced and mailed to the same address (e.g., for later distribution). Accompanying data includes the shipping address and any print data.

Mail distribution—Tangible copies of multiple documents are produced and mailed to different addresses. Accompanying data includes the different mailing addresses and any print data.

Fax distribution—The document is faxed. Accompanying data includes the fax number.

Email distribution—The document is emailed. Accompanying data includes the email address and the desired format for the document. Possible formats can include, for example, PostScript, PDF, Joint Photographic Experts Group (JPEG), Graphics Interchange Format (GIF), Tagged Image File Format (TIFF), Portable Network Graphics (PNG), and bitmap.

Save distribution—The document is saved to memory or another type of electronic storage. A software application ("viewer") can be launched to load the saved document and enable a user to view it. Accompanying data includes where the document should be saved (e.g., a device name and a file path within the device) and the format in which the document should be saved. Possible formats can include, for example, PostScript, PDF, JPEG, GIF, TIFF, and PNG.

In one embodiment, the distribution portion of a packet 130 includes information regarding multiple distribution methods. In this embodiment, the document can be distributed according to one or more of the distribution methods. For example, the distribution portion can include one or more rules that specifies which distribution method should be used and when. One exemplary rule is try to fax the document; if the fax fails, mail the document. Another exemplary rule is always fax and email the document. In this embodiment, the product creator 100 would include multiple distribution utilities 120.

B. Document Processor

Figure 3:
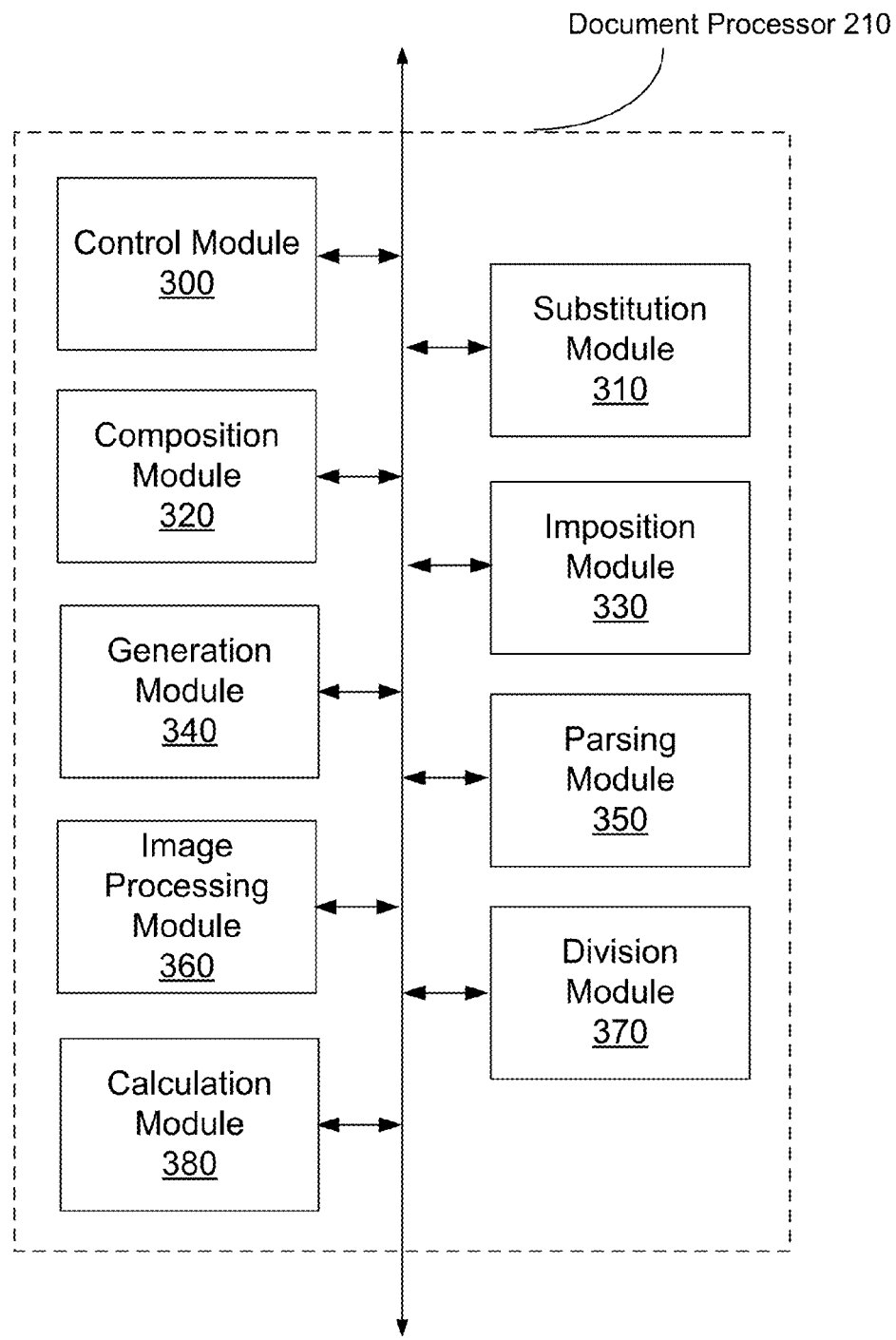
FIG. 3 illustrates a diagram of a document processor, according to one embodiment of the invention.

As described above, a document processor 210 provides various types of functionality for processing a packet 130 (specifically, the document portion of the packet 130). A document processor 210 includes various modules, each of which is configured to provide a particular functionality. FIG. 3 illustrates a diagram of a document processor, according to one embodiment of the invention. In the illustrated embodiment, the document processor 210 includes a control module 300, a substitution module 310, a composition module 320, an imposition module 330, a generation module 340, a parsing module 350, an image processing module 360, a division module 370, and a calculation module 380. All of the modules are communicatively coupled to each other.

For some of these modules, their operation can change based on one or more parameters. In one embodiment, a parameter is input into a module separately from other input values. In another embodiment, a parameter is combined with other input values when it is input into a module. For example, consider a module that modifies an input string. In the former embodiment, the string would be a first input value, and the parameter would be a second input value. In the latter embodiment, the parameter would be embedded in the string, and the resulting string would be the only input to the module.

This latter embodiment is used by some of the modules in the document processor 210. Recall that the document portion of a packet 130 describes a document, including both the document's content and the document's layout. Consider a module that processes this document portion in order to use the specified content and layout to create a final document. The module takes as input VPML code that describes the content and layout. In one embodiment, the VPML code also includes parameters for the module that control the module's operation. These parameters are in the form of new, proprietary tags and attributes. They will be discussed below in conjunction with the module that they control. For more information, see Appendix A.

Control module—The control module 300 controls the operation of the document processor 210. The control module 300 uses the other modules to perform various tasks. The control module 300 will be discussed below in conjunction with FIG. 4.

Substitution module—The substitution module 310 processes VPML code. In other words, VPML code is both input to and output from the substitution module 310. The operation of the substitution module 310 is specified by "substitution tags" that act as parameters, as explained above. If the input VPML does not include any substitution tags, then the output VPML and input VPML are identical. If the input VPML does include a substitution tag, then the output VPML and input VPML can differ. In one embodiment, substitution tags include <choose>, <when>, <otherwise>, <pagenumber>, and <variable>.

The <choose>, <when>, and <otherwise> tags enable conditional logic. A <when> tag functions like an "if" statement. It includes an attribute entitled "test" that is an expression whose value evaluates to a Boolean. A pair of <when> tags surrounds data. If the Boolean is "true," then the pair of <when> tags are removed and the surrounded data is included in the output VPML. If the Boolean is "false," then the pair of <when> tags are removed and the surrounded data is not included in the output VPML. An <otherwise> tag functions like an "else" statement and is used in pairs to surround data. A pair of <choose> tags surrounds one or more <when> and/or <otherwise> pairs and is removed after the surrounded <when> and <otherwise> pairs have been processed. If a <pagenumber> tag is present in input VPML, it is replaced with the page number of the current page.

The <variable> tag functions like a variable. It includes an attribute entitled "name" that is an expression that references a piece of data. This expression can include an evaluation function (see Appendix A). If a <variable> tag is present in input VPML, it is replaced with the content referenced in the name attribute. In one embodiment, the data is a template that defines how a document should be formatted. For example, a data store (such as a database) serves as a repository and registry of templates, called a "template library" (not shown). A template is a set of rules (e.g., conditions or definitions regarding the sizing and/or placement of content) governing the construction (e.g., design and/or layout) of a document. In one embodiment, a template describes a document's header and footer, background, and/or body layout. A template can also describe a portion of a document, such as one page of the document or one portion of one page of the document. In one embodiment, multiple templates are used together to describe a particular type of document that is based on variable content and/or variable layout. One template can be used with different content pieces.

In another embodiment, the data is a piece of content (such as a block of text or a reference to an image). For example, a data store (such as a database), serves as a repository and registry of content (resources), called a "resource library" (not shown). Content can be used in conjunction with a template. Content can be stock or custom. Content can also be text (possibly including VPML) or file-based, including images of any type. One content piece can be used with different templates. In one embodiment, a resource is added to a resource library via a resource processing module (not shown). For example, the resource processing module manages and processes a scanned document and adds it to the resource library so that it can be used in conjunction with a template.

In one embodiment, the value of the "name" attribute is based on data that exists within the packet 130 itself. In another embodiment, the value is based on data that exists in an external data store such as a database. A substitution tag can be used in any portion of the described document, including in a template. A template is defined by a <flowingpage> tag, which is discussed below with reference to the composition module 320.

Composition module—The composition module 320 also processes VPML code. The operation of the composition module 320 is specified by composition tags. If the input VPML does not include any composition tags, then the output VPML and input VPML are identical. If the input VPML does include a composition tag, then the output VPML and input VPML can differ. In one embodiment, composition tags include <content>, <flowingsection>, <flowingpage>, <useflowingpage>, <flowingcontent>, and <repeatreset>.

The composition module 320 "flows" content into columns, sections, and/or pages. For example, if a section is defined so as to fill a page (from top to bottom and from side to side) and the content to be placed in the section is longer than the section height, then the composition module generates one or more additional pages (e.g., by adding one or more  tags to the input VPML) to accommodate the remaining content until all of the remaining content is included. Content flow from one column to the next on the same page is similar. In one embodiment, the composition module uses the division module (see below).

A pair of <content> tags surrounds content that is to be "flowed." A composition attribute entitled "nobreak" can be used in conjunction with a pair of <div>, <table>, <tr>, or <td> tags. Use of this attribute specifies that content contained by these tags should not be divided; instead, the entire content is forced to the next section or page. A <flowingsection> tag defines a rectangular area through which the content (specified by the <content> tags) will be flowed. A <flowingpage> tag defines a page-sized template through which content is flowed (via use of a flowingsection). A pair of <flowingcontent> tags designates one or more pages of output that will be the result of flowing content.

Imposition module—The imposition module 330 also processes VPML code. The operation of the imposition module 330 is specified by imposition tags. If the input VPML does not include any imposition tags, then the output VPML and input VPML are identical. If the input VPML does include an imposition tag, then the output VPML and input VPML can differ. In one embodiment, imposition tags include <newsletter>, <folder>, <twoupimposition>, and <book>.

The imposition module 330 takes as input content divided into one or more pages of a first size and outputs that same content divided into one or more pages of a second size. In one embodiment, this is performed by changing the position of a  tag within VPML code (e.g., with respect to other tags). For example, the location of a  tag in input VPML reflects pages of the first size, while the location of a  tag in output VPML (i.e., after the imposition module has completed operation) reflects pages of the second size. If the first size and the second size are equal, then the input VPML and the output VPML are identical. In other words, the  tags are not moved.

In one embodiment, the first size represents a logical page, while the second size represents a physical page (e.g., a sheet of paper). For example, one physical page can include multiple logical pages. For example, an 18"×12" physical page can be folded in half to present two 9"×12" logical pages on each side of the physical page. The edges of these pages are then cut off, leaving two 8.5"×11" pages. In one embodiment, one physical page corresponds to one sheet of material such as paper. The imposition module can also add "cut" marks to indicate where a sheet of material should be cut (e.g., where a 9"×12" page should be cut to create an 8.5"×11" page, as described above). In one embodiment, the imposition module takes into account particular properties of the input VPML, such as facing pages, duplexing, and/or bleeds.

Generation module—The generation module 340 takes as input VPML code and produces (outputs) a set of commands in a page description language (such as PostScript or PDF). In one embodiment, the production process includes output level variables (such as output device type for a PostScript string) and/or caching. The generation module 340 will be further discussed below in conjunction with FIG. 4.

Parsing module—The parsing module 350 takes as input VPML code in text string format and generates a Document Object Model (DOM) data structure based on the VPML code. In one embodiment, a module that processes input VPML code (such as the substitution module 310, the composition module 320, or the imposition module 330) uses the parsing module 350 to generate a DOM based on the input VPML code. The module then manipulates the DOM rather than the VPML string. VPML code embodied in a DOM can be manipulated more easily than VPML code represented as a text string.

Image processing module—The image processing module 360 determines various properties of an image, such as height, width, resolution (e.g., dots-per-inch or "dpi"), or number of color channels. These properties are used by the generation module 340 in order to specify graphical output. In one embodiment, the image processing module modifies an image to resize it and/or change its format. For example, the image processing module converts Encapsulated PostScript (EPS) files or Joint Photographic Experts Group (JPEG) files to PDF format. In another embodiment, the module edits an EPS file programmatically in order to change colors. For example, at the time of printing, the module replaces a specific color value within an EPS file with a value based on a VPML element attribute entitled "substitution" (see Appendix A). In one embodiment, the replacement value is based on the style or color of the document.

Division module—The division module 370 divides content (as embodied by VPML code) into multiple sections based on dimensions and positions. In one embodiment, the division module divides content into two pieces based on the size of the section where the content is intended to flow. The first piece fits the dimensions of the section. The second piece is the remainder of the content that does not fit into the section.

Calculation module—The calculation module 380 determines the dimensions and positions of content (represented by VPML elements). These values are used by the generation module 340 in order to specify graphical output.

The functionalities of these modules can be combined to accomplish various tasks. For example, given a piece of content (VPML code), the calculation module 380 can be used to determine the height of that content once it is placed in an area of a particular width. As another example, the calculation module 380 and the division module 370 can be used to determine how much content can fit in an area of a particular size (width and height) and how much would be left over.

In one embodiment, the document processor 210 also includes specialized font handling capabilities (see Appendix A).

Figure 4:
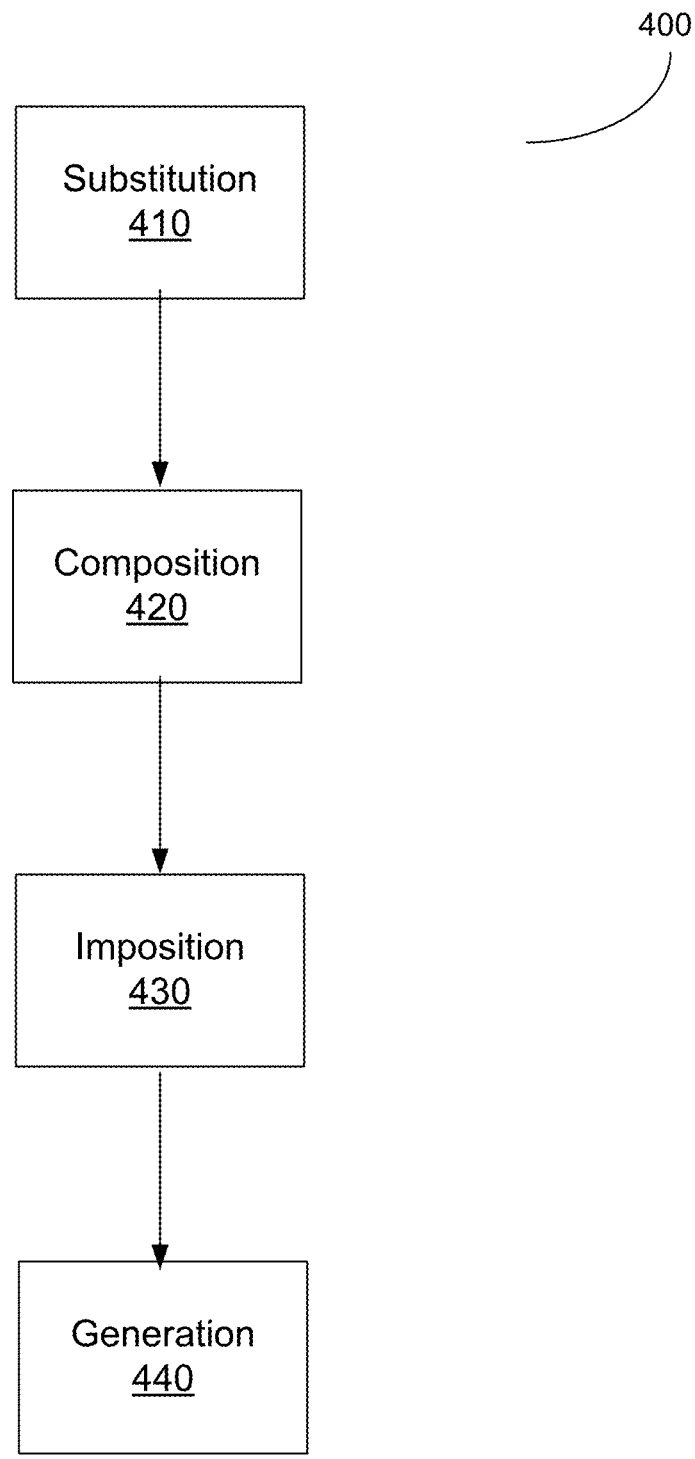
FIG. 4 illustrates a flowchart of a method performed by a document processor, according to one embodiment of the invention.

FIG. 4 illustrates a flowchart of a method performed by a document processor, according to one embodiment of the invention. The input to the method 400 is VPML code (such as the document portion of a packet 130). The output of the method 400 is an electronic file that describes a document using a page description language (PDL). In one embodiment, the PDL is PostScript® 3™ or PDF.

The first step of the method 400 is substitution 410. The control module 300 passes the input VPML to the substitution module 310. The substitution module 310 processes the input VPML based on the substitution tags (if any) and outputs VPML. The next step is composition 420. The control module 300 passes the VPML output by the substitution module 310 to the composition module 320. The composition module 320 processes the VPML based on the composition tags (if any) and outputs VPML. The next step is imposition 430. The control module 300 passes the VPML output by the composition module 320 to the imposition module 330. The imposition module 330 processes the VPML based on the imposition tags (if any) and outputs VPML. The final step is generation 440. The control module 300 passes the VPML output by the imposition module 330 to the generation module 340. The generation module 340 uses data obtained from the image processing module 360 and the calculation module 380 to generate and output a PDL file, such as PostScript or PDF.

C. Levels of Variability

A document processor 210 enables the generation of documents that are based on variable content and/or variable layout. For example, varying the operation of a module (e.g., via input parameters in the form of VPML tags) enables the generation of documents that are based on variable content and/or variable layout. Also, the substitution module 310 in particular enables the generation of documents through its conditional logic and variables.

In one embodiment, a business application 110 enables the generation of documents that are based on variable content and/or variable layout. For example, the document portion of a packet 130 includes (or references, e.g., contains a pointer to) the actual content and actual layout that are used to generate the final document. In this embodiment, the "variable" nature of the document (whether it concerns the document's content or layout, or both) is primarily embodied in the packet 130 that is generated by the business application 110. For example, the business application 110 includes logic that enables it to generate a packet 130 with different content and/or layout. The determination as to which content and layout is used in the packet 130 is based on, for example, user input or pre-specified defaults.

In one embodiment, image overlay enables the generation of documents that are based on variable content and/or variable layout. For example, a first image file contains static content (i.e., content that does not vary across documents). A second image file contains variable content (i.e., content that does vary across documents). Multiple "second" image files would exist, where each file specifies an image of the variable content for one document. A document is generated by using the image from the first file as a "base" and overlaying on top of it the image from one of the "second" files. The image from the first file specifies an area of a fixed size and position that is left blank in order to accommodate the image from the second file. In this way, the first file is used repeatedly with different sets of variable content (as embodied in the "second" files). In one embodiment, the first file is cached in order to improve performance (e.g., a printer caches the first file in order to increase printing speed).

In one embodiment, the first image file and the second image file(s) are written in PostScript. The first image file and a second image file are concatenated to form one PostScript file that describes the resulting document. In one embodiment, the first file is created by inputting VPML code into the document processor 210. The VPML code is written manually or generated by using a business application 110.

Image overlay is further described in the Data Document section of Appendix A. This approach is used in the mail distribution utility 120, where the varying content is the mailing addresses. This approach is also used in the Notices example (see below), where the varying content is specific to a living unit such as an apartment or condominium.

Thus, many mechanisms exist to generate documents that are based on variable content and/or variable layout. Which of these mechanisms are most suitable will depend on the specific situation. Mechanisms differ in terms of the amount of variability and flexibility that they offer. Also, mechanisms operate at different times during the publishing process, and the variable data may or may not be available at those times.

D. Control Logic

As described above, the control logic 200 generates a deliverable document using the document processor 210. The control logic 200 also distributes the deliverable document based on the packet 130 (specifically, based on the distribution portion of the packet 130).

In one embodiment, each distribution method is embodied in the control logic 200 within the distribution utility 120. The control logic 200 generates a copy of a particular document using the document processor 210 and also distributes the copy. In one embodiment, the control logic 200 performs one or more of the following: verify and assemble content; integrate content with stored resources; format content into modules, pages, documents, and volumes; determine, optimize, and manage output (format) and delivery (distribution) requirements; and logging (create audit log, document archive, and management report; track progress of document).

In one embodiment, the various control logics 200 function as follows:

Save logic—The save control logic 200 determines the desired format for the deliverable document based on the accompanying data in the distribution portion of the packet 130. If the desired format is PostScript or PDF, the logic uses the document processor 210 to generate the PostScript or PDF. If the desired format is something else, the logic uses the document processor 210 to generate PostScript or PDF and then converts the PostScript or PDF to the desired format. The logic then saves the file to the desired location based on the accompanying data in the distribution portion of the packet 130.

Email logic—The email control logic 200 determines the desired email address for the deliverable document based on the accompanying data in the distribution portion of the packet 130. The logic then emails the document to the desired address. In one embodiment, the logic uses an automated email software application such as Secure iNet Factory (from JSCAPE of Mesa, Ariz.) or the JavaMail API package, which is part of the Java Platform, Enterprise Edition (JavaEE) (from Sun Microsystems, Inc. of Santa Clara, Calif.). In one embodiment, the software application is accessed by using the <cfmail> tag within the ColdFusion Markup Language (CFML) of the ColdFusion MX 7 programming language (from Adobe Systems Incorporated of San Jose, Calif.) to email the deliverable document. The deliverable document is generated in the desired format in a similar manner as performed by the save logic. In one embodiment, if the email is returned (e.g., because it is not deliverable), the email logic is notified and can take further action (e.g., notify a user or software application or try a different distribution method).

Fax logic—The fax control logic 200 determines the desired fax number for the deliverable document based on the accompanying data in the distribution portion of the packet 130. The logic then faxes the document to the desired number. In one embodiment, the logic uses an automated fax software application such as Internet Fax (from Venali, Inc. of Coral Gables, Fla.), RightFax (from Captaris, Inc. of Bellevue, Wash.), or Fax On Demand (from AirComUSA of Provo, Utah) to fax the deliverable document. The deliverable document is generated in a format that is supported by the automated fax application in a similar manner as performed by the save logic. In one embodiment, the format is a page description language (e.g., PDF) or an image file (e.g., TIFF). In one embodiment, if the fax is returned (e.g., because it is not deliverable), the fax logic is notified and can take further action (e.g., notify a user or software application or try a different distribution method).

Print logic—The print control logic 200 uses the document processor 210 and the packet 130 to determine instructions to send to various output devices such as printers, distillers, and decomposition services. The devices operate in accordance with the instructions to generate various hard copy materials. In one embodiment, these materials are subjected to various finishing processes such as cutting, folding, boxing, and labeling. The print logic will be further discussed below.

Ship logic—The ship control logic 200 determines the desired shipping address for the deliverable documents based on the accompanying data in the distribution portion of the packet 130. The logic then generates a shipping label that can be affixed to a box of deliverable documents. The deliverable documents are generated in a similar manner as performed by the print logic. In one embodiment, the ship logic analyzes the desired shipping address (e.g., to confirm that it is valid) before generating the shipping label. In one embodiment, if the address is invalid, the ship logic is notified and can take further action (e.g., notify a user or software application or try a different distribution method).

Mail logic—The mail control logic 200 determines the desired mailing addresses for the deliverable documents based on the accompanying data in the distribution portion of the packet 130. Consider a document that has multiple versions, where different versions are sent to different addresses. Initially, one packet 130 exists for each version of the document. This packet 130 describes the document and the mailing addresses to which it should be sent. The mail logic removes the addresses from the various packets 130 and sorts them based on postal route (e.g., using a software application such as AccuZIP6, from AccuZip Inc. of Atascadero, Calif.). Then, the logic combines the different document versions and the sorted addresses into one large packet. This large packet is printed using the print logic. For each address, the correct document version is determined and printed using that address. The hard copy materials are thereby generated in postal route order. This way, the finishing process will produce deliverable documents in postal route order. In one embodiment, the mail logic analyzes the desired mailing addresses (e.g., to confirm that they are valid) before generating the deliverable documents. In one embodiment, if an address is invalid, the mail logic is notified and can take further action (e.g., notify a user or software application or try a different distribution method).

E. Print Control Logic

Recall that a packet 130 that specifies print as a method of distribution is referred to as a job. When this packet 130 is first received by the distribution utility 120, it is called a job request. After the request has been accepted by a queue, it is called a job. In one embodiment, the print logic determines to which device or queue a job request should be sent. This determination is made based on one or more factors such as physical location (e.g., of the device and/or of the ultimate recipient), functionalities (e.g., required by the job request and/or provided by the device/queue), and capabilities (e.g., throughput or latency of a device/queue).

As a job is being processed, it can reach various events or statuses. In one embodiment, the possible events/statuses include: created/requested (job has been created but not yet begun processing); started/in progress (distribution utility 120 has begun processing and fulfilling job); fulfilled/finished (job has been successfully fulfilled and completed); faulted/finished (job encountered problems during processing and could not be fulfilled); cancelled/finished (job was cancelled (aborted) before processing); and aborted/finished (job was aborted during processing before fulfillment was complete). In one embodiment, as a queue processes a job, it saves the job's status to memory or notifies a user or an application about the job's progress.

Print control logic 200 includes various modules, each of which is configured to provide a particular functionality. In one embodiment, the modules and their particular functionalities are as follows:

Job management module—A job management module manages the lifecycle of a job. In one embodiment, this includes processing a job until it is in printable form and then submitting it to an output device. In another embodiment, this includes providing notifications of a job's progress (e.g., to a user or to an interested application).

Device management module—A device management module manages the availability and feeding of output devices. In one embodiment, this includes using an output device to produce a document. A device can include one or more parameters (properties), such as IP address, username, password, and prompt. A device can include one or more queues or channels. A queue or channel can include one or more parameters (properties), such as name and output path. In one embodiment, a device is defined and/or configured by XML code.

User interface module—A user interface (UI) module enables a user, such as an administrator or a device operator, to view and/or modify job management and processing. In one embodiment, this includes controlling queues and/or output devices. In one embodiment, the UI is graphical and is web-based. For example, a user uses a web browser to communicate with a web server, and the web server sends the UI to the user in the form of a web page.

Services toolkit module—A services toolkit module provides various tools. In one embodiment, these tools are for decomposing ("decomping"), distilling, printing, logging, and database resource management.

Database module—A database module stores data and status information related to jobs, processes, and/or output devices.

3. Business Application

Figure 5:
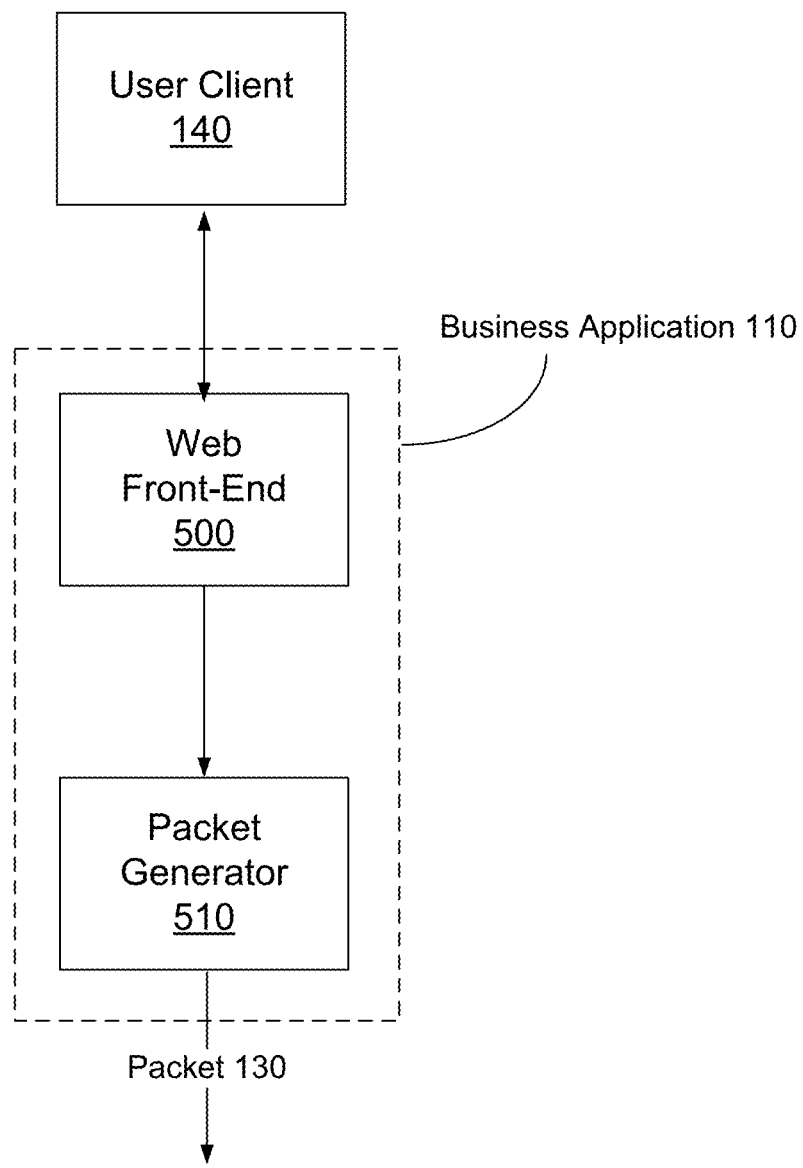
FIG. 5 illustrates a diagram of a generic business application, according to one embodiment of the invention.
Figure 6A:
Figure 6B:
Figure 6D:
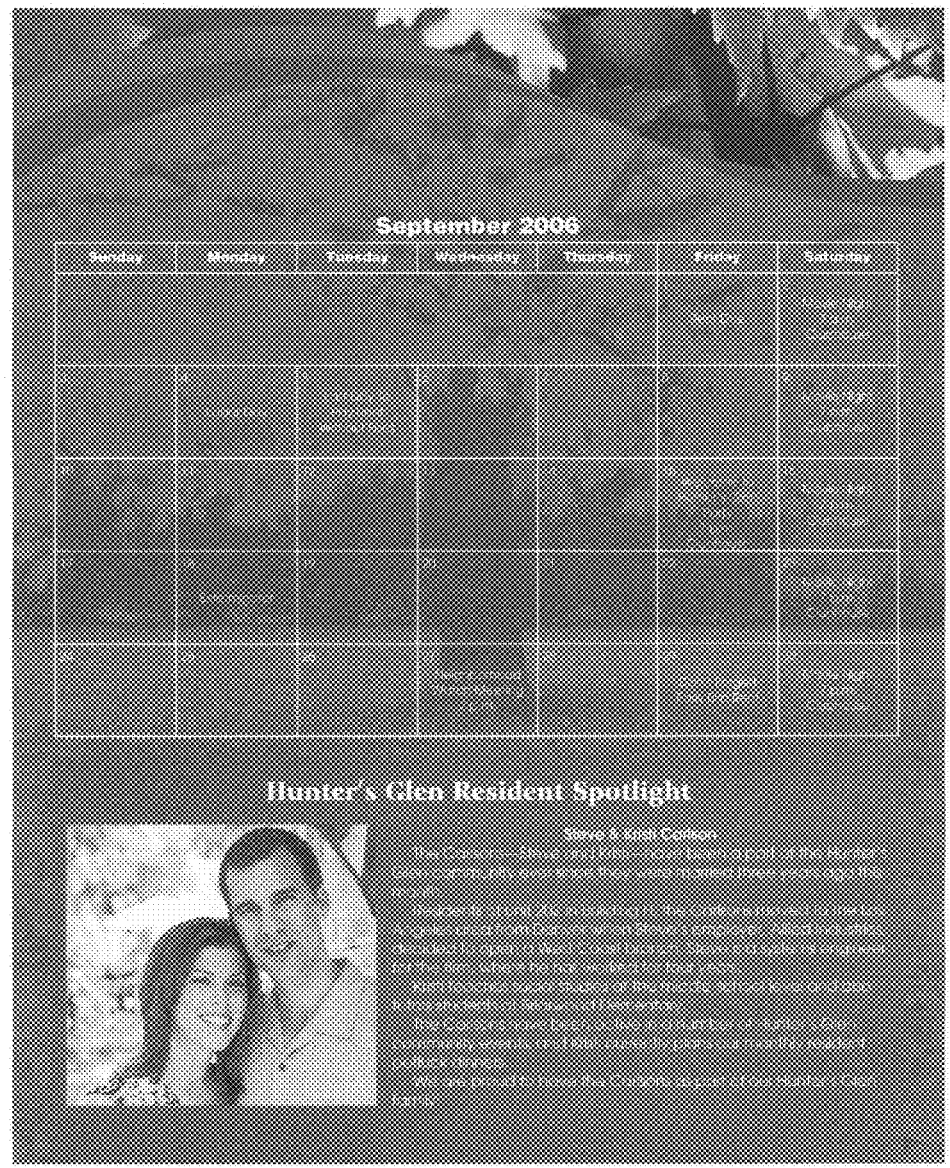

FIG. 5 illustrates a diagram of a generic business application, according to one embodiment of the invention. In the illustrated embodiment, the business application 110 includes a web front-end 500 and a packet generator 510. The web front-end 500 and the packet generator 510 are communicatively coupled. The web front-end 500 enables a user to specify, via a web browser, a document and/or a distribution method. The packet generator 510 generates a packet 130 that is transmitted to the distribution utility 120.

The web front-end 500 enables user interaction via one or more user interfaces. In one embodiment, a user interface is graphical and comprises a web page that is viewed by a user via a web browser. For example, the web front-end 500 generates a web page and sends it to the user's computer. In one embodiment, the web page is generated automatically by a software application written using the ColdFusion MX 7 programming language (from Adobe Systems Incorporated of San Jose, Calif.) and/or the Java programming language (from Sun Microsystems, Inc. of Santa Clara, Calif.).

In one embodiment, a user interface enables a user to collect, edit, view, and/or manage content or templates. By using the user interface, a user can specify a document, which is eventually embodied in a packet 130. For example, a user selects a template and various content. These choices are saved in a data store. The packet generator 510 accesses the data store and generates a packet 130 based on the saved choices and/or based on other saved data such as templates (e.g., in a template library), content or resources (e.g., in a resource library), or other data (e.g., in a database or web service). The packet 130 is then sent to the distribution utility 120.

A. Exemplary Business Application—Magazines

In one embodiment, the business application 110 is designed for working with magazines. In this embodiment, the product creator 100 can be used to create and/or distribute magazines. As used herein, the term "magazine" refers generally to any type of periodical publication, including (but not limited to) a periodical publication, possibly issued at regular intervals, containing articles, stories, photographs, advertisements, and/or other editorial content; a product comprising a paperback periodic publication as a physical object; a publication that is issued periodically, possibly bound in a paper cover, and typically containing essays, stories, poems, photographs, drawings, etc., possibly specializing in a particular subject or area (such as hobbies, news, or sports); and a periodical publication containing a collection of articles, stories, pictures, and/or other editorial content.

Examples of a magazine include, but are not limited to, a newsletter, brochure, pamphlet, booklet, leaflet, periodical, issue, edition, volume, circular, report, guide, handbook, workbook, manual, journal, collection, series, tabloid, proof, glossy, monthly, quarterly, fanzine, newsmagazine, review, installment, supplement, and subscription.

In one embodiment, the business application 110 is designed for working with newsletters. A newsletter is a cyclical publication that is designed to communicate with a particular readership, such as residents of a particular geographic community, employees of a particular business, or clients, patients, or prospects of a particular professional. In one embodiment, a "community" is comprised of people with similar interests, hobbies, or areas of expertise. In another embodiment, a "community" is comprised of other similar audiences who are served by newsletters.

In one embodiment, the newsletters business application 110 includes three user interfaces. A first user interface enables a user to view and/or edit a newsletter via an editing application ("editor"). A second user interface enables a user (such as a newsletter customer like an apartment manager) to view production status or account information. A third user interface enables a user (such as a publishing administrator or operator) to manage production status or account information.

Consider, for example, how an Apartment Manager might use the product creator 100 to create and/or distribute a resident newsletter for an apartment community.

In the past, this Manager was left with few options for the creation of such a newsletter: hand-written or typed flyers; desktop publishing solutions that then had to be printed or copied in the company office or at a local copy center; or use of existing commercial newsletter services where monthly information had to be submitted by fax or, at best, typed into web forms that were then emailed. Use of existing commercial providers also meant either waiting for a "Proof" of the newsletter to be returned for approval or foregoing proofing altogether.

By using a product creator 100 that includes a business application 110 that is designed for working with newsletters, this process can change and be improved in several ways. The Manager could first contact the Newsletter Provider to set up a customer account. This contact might take place by telephone, over the Internet, through correspondence, or in a variety of other ways that could, for example, be completely automated. In setting up this account, the Manager would provide typical billing and shipping information, which could include: Company Name, Contact Name, Title, and Company Address (including City, State, and Zip). If the shipping or billing addresses differed from the aforementioned information, that fact could also be included in creating the customer record. The customer account record likely might also include such information as the quantity of newsletters to be produced and how and where they might be delivered.

In addition, during this set-up process, a representative of the Provider might create for the Manager an appropriate Login and Password; or creation of these elements might be an automated process. This Login and Password could then, for example, be used to access an interface that enables online creation of a newsletter.

The Manager, in this case using a computer with Internet access, could navigate using a Web browser to the correct URL address. (The Manager might also access the interface through a PDA, a cellular phone, or other device.) The Manager could then enter the assigned Login and Password in the appropriate fields so as to "sign on" to the customer's newsletter account.

Once signed on, the Manager might be able to execute a number of important functions, which could include, but would not be limited to: updating or changing basic account information (contacts, passwords, print quantity, etc.); reviewing or paying outstanding invoices; tracking the shipment or delivery of newsletters already created; and editing, previewing, and submitting new newsletters to be printed.

For this example, consider a case in which the Manager might use this version of the invention to execute the last of these functions: editing, previewing, and submitting a newsletter for production. Having already signed on, the Manager could select (e.g., using an input device such as a keyboard or mouse) an icon or similar text or graphic representation of a pre-designed newsletter template that is available to edit. Such an action might launch a user interface or "online editor" in the browser window that would allow the Manager to add or edit content in the newsletter template. This content could include, but would not be limited to: articles, photos, advertisements, staff listings, important phone numbers, office hours, seasonal messages (both text and graphics), customized calendars, or any other content the Manager wanted to communicate to residents of the apartment community.

In addition to creating or uploading original content, the Manager might be able to select from a resource library of prewritten articles and preloaded graphics or photographs to help fill the newsletter template. Assuming that the Manager is viewing a web-based representation of a newsletter, these actions would be accomplished by steps such as the following, which might be used to add an original article to the newsletter:

select a section of the newsletter
    select the hot-link labeled "Add Item"
    select a hot-link icon for a content type, such as one labeled "Standard Story"
    enter a headline and article in the appropriate fields
    select "save"
    select "spell-check"
    select "done."

This process can be repeated. For example, a content item can be added to another section of the newsletter. As another example, an additional content item can be added to the current section.

Assuming that the Manager is viewing a web-based representation of a newsletter, to make use of the resource library of prewritten articles and preloaded graphics or photographs, the Manager might follow these steps:

select a section of the newsletter
    select the hot-link labeled "Add Item"
    select a hot-link icon for the content type labeled "Story-File Library"
    find related prewritten articles (e.g., by browsing articles or by searching articles based on keyword, full-text, and/or category)
    select the desired article to insert it into the newsletter.

This same process could be used to create original content or to make use of the resource library of prewritten articles and preloaded graphics or photographs until the newsletter was complete.

During the creation process, line counts might be available at the top of each newsletter section to indicate how many lines of content were still available in the section. At any point in the creation of the newsletter, the Manager could select "Proofread My Newsletter" and be presented with an online PDF proof of the newsletter to quickly and easily know how it would look in print.

Once the Manager was satisfied with the newsletter, it could be submitted by selecting the "Submit My Newsletter" icon. Upon performing this action, the Manager might be presented with a summary of the newsletter that might include, but would not be limited to: indications as to whether too much or too little content had been included in any given section, an estimated invoice total, a copy of subscriber Terms and Agreements, and an option to have any remaining space filled with prewritten editorial content. Estimated delivery information might also be presented, along with instructions for contacting Customer Support with any additional questions or concerns.

Once the newsletter had been submitted by the Manager, the formatted content in the newsletter template from the online editor could be converted by a distribution utility and document processor into printed output. One form of this printed output might be a grayscale (black and white) rendering of the newsletter to be used for proofing by the Provider's proofreading staff.

Once any changes or corrections had been made to the original submitted newsletter, the distribution utility and document processor might create the final, high-resolution, full-color PostScript file to print the correct quantity of newsletters on a high-end, digital printing device.

These printed newsletters might be subjected to various finishing processes (cutting, folding, boxing, labeling) and then could be shipped in finished form to the Apartment Manager for distribution. Alternately, the newsletters could be addressed individually for postal delivery to each apartment (e.g., using the mail distribution utility).

In this example, the Apartment Manager would have made use of one embodiment of the invention to quickly and easily create a community newsletter using a process that enabled online WYSIWYG (what you see is what you get) editing and quick and easy previewing of what the finished product would be.

FIGS. 6A-6D each illustrate one page of a newsletter, according to one embodiment of the invention. This newsletter was created using a product creator 100 that included a newsletters business application 110 and a save distribution utility 120.

An exemplary business application 110 that is designed for working with magazines is further described in Appendix B.

B. Exemplary Business Application—Resale Documents

In one embodiment, the business application 110 is designed for working with resale documents. In this embodiment, the product creator 100 can be used to create and/or distribute resale documents. In one embodiment, resale documents are documents required for the transfer, sale, and/or purchase of a residential home. For example, in certain states (e.g., Arizona, Pennsylvania, Virginia, and Nevada), a seller of a home within a certain managed community is required by law to provide a buyer a complete set of specified disclosure documents in order to complete the sale of the home. In one embodiment, resale documents are full-color customized packages containing static documents and/or documents that are based on variable content and/or variable layout.

In one embodiment, the resale documents business application 110 includes three user interfaces. A first user interface enables a user (such as a customer of a residential property management company) to place an order for resale documents, pay for the order, track the status of the order, and receive the order in time for the closing of the sale. A second user interface enables a user (such as a management company employee) to manage and monitor the resale document order system and to provide data. A third user interface enables a user (such as a publishing administrator or operator) to create and configure resale document formats, add new data to include in the resale documents, and manage production status or account information.

Consider, for example, how an Agent working for a Title Company might use the product creator 100 to order documents required to close the sale of a home.

In the past, this Agent was required to create and/or complete forms manually to request the required documents from a residential property management company. Once the request was received, the Agent had to wait for the required documents to be manually created, completed, and/or duplicated and sent back to the Agent before the sale of the home could close.

By using a product creator 100 that includes a business application 110 that is designed for working with resale documents, this process can change and be improved in several ways. The Title Company Agent could first contact the Provider through a property management company to set up a customer account. This contact might take place by telephone, over the internet, through correspondence or in a variety of other ways that could, for example, be completely automated. In setting up this account, the Agent would provide typical billing and shipping information, which could include: Company Name, Contact Name, Title, and Company Address (including City, State, and Zip).

In addition, during this set-up process, a Login and Password would be created for the account, which could also be a completely automated online process. This Login and Password could then, for example, be used to access an interface that is a part of this version of the invention that allows the Agent to place an order requesting certain documents required for closing the sale of a home. Those documents could include, but would not be limited to, a Resale Certificate and Resale Documents from a Property Management Company and/or Homeowners Association to which the property was attached.

The Agent, in this case using a computer with Internet access, could navigate using a web browser to the correct URL address. (The Agent might also access the interface through a PDA, a cellular phone, or other device.) The Agent could then enter the assigned Login and Password in the appropriate fields so as to "sign on" to the Title Company's account.

Once signed on, the Agent might be able to execute a number of important functions, which could include, but would not be limited to: updating or changing basic account information; reviewing or paying outstanding invoices; tracking the shipment or delivery of documents already requested and created; and placing new orders or document requests.

For this example, consider a case in which the Agent might use this version of the invention to execute the last of these functions: placing a new order for documents required to close the sale of a residential home. In this example, these documents include a Resale Certificate and a set of the appropriate Homeowners Association Documents Having already signed on, the Agent could navigate using simple mouse clicks to the appropriate web form for submitting a resale document order. (In the alternative, the Agent might also be able to download printable forms to fill out and submit by mail or fax if that was the preferred method.) If completing the order online, as in this example, the Agent would provide the required information pertaining to the sale of the home by entering data through a web-based wizard. This data might include, but would not be limited to, the exact physical address of the property, name(s) of the seller(s), name(s) of the buyer(s), purchase price, and scheduled closing date.

Based on pricing set by the Property Management Company and perhaps depending upon the turn-around time required for the order, the Agent could then pay for the document order via a variety of options while online: credit card, electronic check, through a corporate account previously set up by the Title Company, or with a Coupon Code generated by the Provider and supplied to the Title Company. In the alternative, the Agent could mail a paper check to the Property Management Company to pay for the order. Once payment for the order was received, the resale document order might then be scheduled for fulfillment by the Provider.

If required (according to settings used when the property was originally registered with the Provider by the Property Management Company), notification of the pending sale might be sent via electronic mail to such entities as an inspector, a manager, a Property Management Company, or the Title Company. Various pieces of data pertaining to the designated property might be provided by any of those entities until all information required to produce the requested resale documents had been compiled.

In this exemplary embodiment of the invention, the Provider might combine the variable data provided by the above-mentioned entities to produce through a distribution utility a Resale Certificate, which might include, but would not be limited to, such pertinent information as the name(s) of the current owner(s), the address of the property, the Homeowners Association to which the property is attached, any account balance the current owner(s) might have with the Property Management Company, Special Assessments or Maintenance Fees associated with the property, and when and to whom those fees might come due.

In the alternative, the Document processor could also produce a PDF version of the Resale Certificate, which could then be sent via electronic mail or fax to the Agent.

The Provider might also use a resource library of pre-scanned documents to produce the appropriate Homeowners Association documents requested in the order. These documents might include, but would not be limited to, Homeowners Association Bylaws, Articles of Incorporation, Declarations, and Rules and Regulations.

These documents might all be contained in a comprehensive Resource Library of community documents. To create this library, each community (through the Property Management Company) might submit the appropriate documents attached to the community. The documents might be scanned, cleaned, and put through a rigorous quality control process whereby a community manager might provide final approval for the appropriate set of community documents, which then would become the "official" set of static documents attached to the community.

Triggered by the property address, which the Property Management Company would have registered with the Provider, the appropriate Homeowners Association documents might be compiled from the resource library database, along with pertinent variable information provided on the web-based interface or data retrieved externally from the Property Management Company, and converted by the distribution utility to produce one or more full-color, fully customized perfect-bound books to be provided to the Buyer(s) before the closing of the sale of the residential home.

In this example of one embodiment of the invention, a complete custom-printed package would be delivered to the Agent of the Title Company that might include, but would not be limited to, a folder containing the Resale Certificate and any pertinent Property Management Company or Homeowners Association documents that require signatures at closing and the perfect-bound book(s) containing pertinent documents from the appropriate Homeowners Association, thus fulfilling the order placed by the Agent.

In this example, the Agent would have made use of one embodiment of the invention to quickly and easily place an order for documents required to close the sale of a residential home, made payment for the order, and then received those documents in a handsome, full-color customized package in time for the closing of the sale.

An exemplary business application 110 that is designed for working with resale documents is further described in Appendix C.

C. Exemplary Business Application—Notices

In one embodiment, the business application 110 is designed for working with notices. In this embodiment, the product creator 100 can be used to create and/or distribute notices. In one embodiment, notices are cyclical notices (e.g., fire safety plans, window guard notices, and lead-based paint notices) that are statutorily required to be distributed to occupants of units in some communities in certain municipalities. For example, New York City requires such notices under Local Law 1 of 2004 (the NYC Childhood Lead Poisoning Prevention Act of 2003); 3 RCNY (Rules of the City of New York) §43-01 (Residential Fire Safety Plans and Notices); and Window Guard Regulations of the City of NY 6-30-01 §12-03.

In one embodiment, the notices business application 110 includes two user interfaces. A first user interface enables a user (such as a management company) to create notices. A second user interface enables a user (such as a publishing administrator or operator) to create notice formats, add new data to include in the notices, and manage production status or account information.

Consider, for example, how a Property Management Company in charge of a multifamily residential building in a city that statutorily requires notices might contract with an outside company (the Provider) to fulfill this requirement for distribution and tracking of Annual Notices and use the product creator 100 along the way.

In the past, a Property Management Company would have been forced to produce multiple copies of Annual Notices, see that they were delivered to the appropriate units (usually by hand), collect responses and tally results by hand, and then follow up on required actions to attempt to remain in compliance with prevailing statutes. This task was often accomplished by hiring seasonal or part-time help.

By using a product creator 100 that includes a business application 110 that is designed for working with notices, this process can change and be improved in several ways. The Property Management Company might register or set up its building with the Provider, supplying a comprehensive listing of each unit's exact postal address. As part of this building set up, the Property Management Company might also indicate which of the available Annual Notices should be sent.

These Notices might include, but would not be limited to, notices regarding a fire-safety plan, including information about sprinkler systems, fire alarms, and means of egress; notices regarding window guards; and notices regarding lead-based paint. Any or all of these notices, or others, might be required by federal, state, or municipal laws.

Once the set up of the building was complete, and taking into account the timing required by any governing statutes, the Provider might create completely customized Annual Notices for each unit within the building managed by the Property Management Company.

To accomplish this task, the business application might use the variable data in the Provider's database (entered during building set-up) or data retrieved externally from the Property Management Company, in combination with pre-created documents in the Resource Library.

From this combination of resources, as translated by the distribution utility, a multi-page booklet might be created for each unit within the building. This booklet might include, but would not be limited to:

A) Any verbiage or graphics required by statute, including municipal seals or signatures.

B) A letter from the Property Management Company (including the company logo, if any) explaining the contents of the booklet and the action, if any, that might be required from the occupant(s).

C) A Fire Safety Plan, including information, if available, about the building construction, sprinkler system, fire alarms, speaker system, and the best means of egress from the apartment, the floor, and/or the building in case of a fire.

D) Window Guard Notices, inquiring as to whether any occupants of the unit are under a certain age and whether window guards need to be installed and/or repaired.

E) Lead-Based Paint Notices, inquiring as to whether any occupants of the unit are under a certain age, which might subsequently trigger requirements for peeling paint inspections. Lead-based paint notices might automatically be generated for those buildings constructed before a certain year.

In addition, these notices might contain several other features, including, but not limited to: translations of the information into Spanish and/or other languages and perforated, detachable return postcards for occupants to record their required responses to inquiries about window guards and/or lead-based paint.

For the first round of notifications, the Provider might mail to each individual unit the appropriate Annual Notice booklet. Some occupants might then detach the included return postcard, complete the required information and/or acknowledgements, and mail the pre-addressed postcard back to the Provider. The postcard might be imprinted with a unique, unit-specific bar code, enabling it to be automatically recorded for the proper unit.

These responses might then be scanned, recorded, and included in online response-tracking reports accessible to the Property Management Company. Images of the actual return postcards might be kept as permanent records for the Property Management Company.

It is likely that not all occupants would respond to the first round of Annual Notices. Therefore, at a date determined by either statute or the Property Management Company, the Provider might initiate a second round of notification, sending another copy of the Annual Notice booklet to those addresses where no response was recorded or the response received was unclear or incomplete.

In addition, the Property Management Company might receive a report of all non-responding units. Responses from the second round of notifications would also be scanned, recorded, and included in online response-tracking reports accessible to the Property Management Company.

At this point, the Provider might create a third series of postcards to be used to help bring the building to 100 percent compliance. The business application would use the variable data in the Provider's database (entered during building set-up and recorded responses to the two rounds of notifications) or data retrieved externally from the Property Management Company, in combination with pre-created documents in the Resource Library, to create a packet to send to the distribution utility to produce a series of postcards that might be sent directly to the Property Management Company or to a building manager or superintendent.

This third set of postcards would include a pre-addressed return postcard for all non-responding units so that the Manager or Superintendent might go door-to-door to complete the required information and then send the card back to the Provider.

In addition, a postcard might also be created for a unit where action was required to bring the unit into compliance (e.g., the installation or repair of window guards). This pre-addressed return card might provide an area for the building representative to indicate that the required action had been taken and could then be sent back to the Provider.

Responses from this third round of postcard notifications might then be scanned, recorded, and included in online response-tracking reports accessible to the Property Management Company, enabling the company to monitor the process and ensure that the building attained 100 percent compliance or the level of compliance required by statute.

In this example, the Property Management Company would have made use of one embodiment of the invention to more quickly and easily create and distribute Annual Notices that the law required be sent to occupants of its building. In addition, it would have made use of online reports to track responses to the notifications and would have received notification of those units where responses were not recorded and/or units where action was required to bring the units into compliance with prevailing statutes.

4. Additional Embodiments

Although the invention has been described in considerable detail with reference to certain embodiments thereof, other embodiments are possible as will be understood to those skilled in the art.

APPENDIX A

Variable Print Markup Language (VPML)

1. Formatting and Layout (Some Standard, Some Proprietary)

a. Tags

Special characters or symbols—Special characters or symbols are supported by using numeric character references or character entity references as defined in Chapter 5.3 ("Character References") of the HTML 4.01 Specification (W3C Recommendation 24 Dec. 1999). A numeric character reference is a numeric representation of a character. A character entity reference is a standard name of a character. For example, the character "©" is represented by the numeric character reference "169" and the character entity reference "copy." In use, these references are formatted as "&#NumericCharacterReference" (e.g., "©") and "&CharacterEntityReference" (e.g., "©"), respectively. In one embodiment, when the document processor 210 encounters a numeric character reference or character entity reference, it converts the reference to a corresponding ASCII value within a font.

<!--Comments-->—Comments are supported. They are ignored during processing but are returned by the toString method.

<b>, <strong>—These elements enclose text which should be rendered as bolded. These tags are equivalent to <span style="text-weight: bold;"/> . . . </span>.

<br>—Functions as expected.

<div>—For example, <div style="" class="" align="left|center|right" valign="top|middle|bottom|baseline"></div> functions as expected. Defaults to 100% wide unless otherwise specified. Nesting of div and other tags is allowed. Relatively positioned divs are vertically arranged. Absolutely positioned divs derive their z-index from the order in which they appear in the code, with trailing divs on top. Attributes supported include: align (affects relatively positioned child elements), background-color, border, class, color, crop, font-family, font-size, font-style, font-weight, height, leader-dots, left, line-height, nowrap, padding (left, top, right, bottom), position, rotation, scale, substitutions, text-align, top, underline, valign, width, xoffset, yoffset.

<i>, <em>—These elements enclose text which should be rendered as italicized. These tags are equivalent to <span style="text-style: italic;"/> . . . </span>.

<img>—For example, <img src="" height="" width=""/>. The following image types are supported: EPS, JPEG (grayscale, RGB, CMYK), PDF, PostScript, TIFF (grayscale, RBG, CMYK; no compression, except for decompositions, explained below), PNG, and bitmap. Images can be resized in the following ways: Directly—both height and width attributes are provided in the img tag. The image is scaled on both axes to fit. Indirectly—one dimension (either height or width) is specified. The image is scaled proportionally. Height and/or width can be specified as a percentage. Type—when this attribute is set to "tiff_decomped", the TIFF is treated as the result of a Decomposition Service output. "Decomp" TIFFs have the following attributes: Height=791.04 pt (6592 Pixels). Width=612.48 pt (5104 Pixels).

<span>—For example, <span style="" class=""></span>. Functions as expected.

<style>—For example, <style>.HelvNeu20 {font-family: HelveticaNeue-ExtBlackCond; font-size: 20; line-height: 24; color: 0,0,0,1;}</style>. Functions as expected.

<table>—For example, <table style="" class="" height="" width="" cellpadding="" align="left|center|right"></table>. Functions generally as expected. The following attributes are supported: Height, Width=can be percentage, pixel dimension, or not supplied. Results are more predictable if a width is provided. Border=as 1 pixel solid 0,0,0,1 or 1 pixel dashed 0,0,0,1 4 8 (see border for more details). That is lines outside of the table only. Background-color=colors entire table but cells can override. CellPadding=standard behavior. Standard Support=class, left, position, top, width.

<td>—For example, <td style="" class="" height="" width="" align="left|center|right" valign="top|middle|bottom|baseline"></td>. Functions generally as expected. Align=internal elements only. Colspan=supported by columns with cells with specified width. Standard Support=align, background-color, border, class, color, font-family, font-size, font-style, font-weight, height, leader-dots, line-height, nowrap, position, rotation, scale, substitutions, text-align, underline, valign, width, xoffset, yoffset.

<tr>—For example, <tr style="" class=""></tr>. Functions generally as expected. Attributes cascading to cells=align, class, color, font-family, font-size, font-style, font-weight, line-height, nowrap, text-align, underline, valign.

<u>—This element encloses text which should be rendered as underlined. The underline tag is equivalent to <span style="text-decoration: underline;"/> . . . </span>.

b. Attributes align—For example, align="left|center|right". Affects the positioning of contained elements. Cascading=false. Valid tags=div, td.

background-color—For example, background-color: 0,0.5,.0.6,1|0,0,0,1. Standard behavior. Cascading=false. Valid tags=div, td. Values=example [0, 0.5, 1, 0] would mean 0% cyan, 50% magenta, 100% yellow, 0% black.

border (border-left, -right, -top, -bottom)—For example, border: 1px solid 0,0,0,1; border: 1.2px dashed 0,0,0,1 4 8; border-left: 1px solid 0,0,0,1; border-right: 1px solid 0,0,0,1; border-top: 1px solid 0,0,0,1; border-bottom: 1px solid 0,0, 0,1. Specifies the border to be drawn around the perimeter of a container. Cascading=false. Related Attributes=border-left, border-top, border-right, border-bottom. Valid tags=div, td. Values=[width type color(c,m,y,k) spacing]. Examples: 1.2px dashed 0,0,0,1 4 8; 4px solid 0, 0.5, 0.5, 0.

cellpadding—For example, cellpadding="2". Functions as expected. Cascading=false. Valid tags=table.

class—For example, class="helv09". Functions as expected. Cascading=true. Valid tags=div, span, table, tr, td.

color—For example, color: 00.5,0,0,0.3|0,0.5,0.5,0. Functions as expected. Affects the color of text and leader-dots. Cascading=true. Valid tags=div, span, table, tr, td. Values= [cyan, magenta, yellow, black] between 0 and 1. Example: 0, 0, 0, 1=sold black.

crop—For example, crop="true|false". Creates a clipping path out of the boundaries of a container (div or td). A container with this attribute should have a width and height specified. The dimension of the contents will not affect the dimensions of the container. Cascading=false. Valid tags=div, td.

font-family—For example, font-family: AvantGardeBook|Helvetica-Black. Functions as expected. A font has an XML file with a .font extension. In the XML file is a single font element with a named "family." This attribute is used by the FontSource and the document processor for the font-family of the font. Cascading=true. Valid tags=div, span, table, tr, td. Examples=Avant-GardeBook, Helvetica, Helvetica-Black, HelveticaNeue-ExtBlackCond, Times, Frutiger, Frutiger-Black, Frutiger-Light, Frutiger-UltraBlack, Giovanni-Book, Giovanni-Black, Uniform-UltraCond.

font-size—For example, font-size: 12px|9px. Functions as expected. Font-size is in points, where one point equals 1/72 of an inch. Cascading=true. Valid tags=div, span, table, tr, td.

font-style—For example, font-style: italic|normal. Functions as expected. Cascading=true. Valid tags=div, span, table, tr, td.

font-weight—For example, font-weight: bold|normal. Functions as expected. Cascading=true. Valid tags=div, span, table, tr, td.

height—For example, height="200px"; height: 200px; height: 100%. Functions as expected. Dimensions are in points, where one point equals 1/72 of an inch. Cascading=false. Valid tags=div, span, table, tr, td, img.

leader-dots—For example, leader-dots: 3. Leader-dots appear as a dotted line at the bottom of a container with the "leader-dots" attribute. If two columns of text exist and leader-dots are desired, use the following approach: <tr><td width="1%" nowrap>Hello</td><td width="99%" style="leader-dots: 1;"></td><td width="1%">World!</td></tr>. Cascading=false. Valid tags=div, td.

left—For example, left: 100|300px. Functions as expected. Dimensions are in points, where one point equals 1/72 of an inch. Cascading=false. Valid tags=div, table.

line-height—For example, line-height: 15px|10px. Functions as expected. Dimensions are in points, where one point equals 1/72 of an inch. The default line-height is 120% of the font-size. Cascading=true. Valid tags=div, span, table, tr, td.

nowrap—For example, <div nowrap>; <div nowrap="yes">. Functions as expected. Cascading=true. Valid tags=div, span, table, tr, td.

padding (padding-left, -right, -top, -bottom)—For example, padding: 3px; padding-left: 3px; padding-right: 3px; padding-top: 3px; padding-bottom: 3px. Functions as expected. Dimensions are in points, where one point equals 1/72 of an inch. Cascading=false. Valid tags=div, td.

position—For example, position: absolute|relative. Functions as expected. Cascading=false. Valid tags=div, table.

rotation—For example, rotation: 45. A div or table possessing this attribute is rotated clockwise on its lower left-hand corner in the specified degrees. Likewise, a contained element is rotated accordingly. Cascading=false. Valid tags=div, td.

scale—For example, scale: 0.75|0.8. A div or td possessing this attribute is scaled to the specified value. Likewise, a contained element is scaled accordingly. For the value, 1 equals 100%.

substitutions—For example, substitutions: [0.98 0.08 0.08 0.08]=[0.87 0.92 0.23 0.09],[0.08 0.98 0.08 0.08]=[0.03 0.24 0.93 0],[0.08 0.08 0.98 0.08]=[0.04 0.62 0.90 0]. This attribute is used to create dynamic color changes of EPS-type images. An EPS is created with pre-determined, base colors. The Document processor replaces these provided numbers with new values. Multiple replacements can be performed by providing a comma delimited list of values. Cascading=false. Valid tags=img. Values=[old value]=[new value].

text-align—For example, text-align: left|center|right. Functions as expected. Cascading=false. Valid tags=div, td.

text-decoration—For example, text-decoration: underline|normal. Functions as expected. Cascading=true. Valid tags=div, span, table, tr, td.

top—For example, top: 100|300px. Functions as expected. Dimensions are in points, where one point equals 1/72 of an inch. Cascading=false. Valid tags=div, table.

underline—For example, underline: true. Functions as expected. Cascading=true. Valid tags=div, span, table, tr, td.

valign—For example, valign: top|middle|bottom|baseline; valign="top|middle|bottom|baseline". Functions as expected. Cascading=false. Valid tags=div, span, table, tr, td.

width—For example, width=300px; width=30%. Functions as expected. Dimensions are in points, where one point equals 1/72 of an inch. Cascading=false. Valid tags=div, span, table, tr, td, img.

xoffset—For example, xoffset: 8px; xoffset=8px. A contained element is offset along the x-axis by the provided value. Dimensions are in points, where one point equals 1/72 of an inch. Cascading=false. Valid tags=div, td. Values=example, 200 or 200px.

yoffset—For example, yoffset: 8px; yoffset=8px. A contained element is offset along the y-axis by the provided value. Dimensions are in points, where one point equals 1/72 of an inch. Cascading=false. Valid tags=div, td. Values=example, 200 or 200px.

2. Substitution (Proprietary)

a. Tags

Together, the "variable," "choose," "when," and "otherwise" tags handle variable replacement and conditional logic. Variable replacement occurs before the generation stage. The generation stage variables are discussed in the Data Document section.

<variable>—For example, <variable name="username"/>; <variable name="dateFormat('dateshort', startDate)"/>; <variable name="getPageContents(getXml (newsletter.content),1)"/>. The Variable tag is replaced with the content referenced in the name attribute. The value of the name attribute is evaluated and thus is allowed to contain Evaluation functions (see below). The actual values available to the Document processor and the packet writer are determined by the distribution utility. The results of the evaluation are then processed for any variables. Required Attribute—name. Optional Attribute—processingstage. (Controls when the variable is evaluated. Stage 1 is the default and occurs before Imposition. Stage 2 occurs during imposition when the volume variable is available.)

<choose>—For example, <choose>. The Choose tag contains one or more When elements and possible an Otherwise. The contained When elements are evaluated in order until a positive evaluation occurs. At that point, no further elements are evaluated. If no When elements are triggered, then the OtherWise is processed. Optional Attribute—processingstage. (Controls when the choose element is evaluated. Stage 1 is the default and occurs before Imposition. Stage 2 occurs during imposition when the volume variable is available.)

<when>—For example, <when test="priority gt 10">. The When tag is the Document processor "if" tag. The value of the required test attribute is evaluated. If the result is the string "true" or a logical true, then the contents of the When element is included in the output. Optional Attribute—processingstage. (Controls when the when element is evaluated. Stage 1 is the default and occurs before Imposition. Stage 2 occurs during imposition when the volume variable is available.)

<otherwise>—For example, <otherwise>. The OtherWise element's content is included in the result if all other When elements inside a Choose element evaluate to false.

<pagenumber>—For example, <pagenumber/>. <pagenumber/> outputs the current page number. <pagenumber reset="true"/> resets the page number counter. <pagetotal/> outputs the total number of pages. Sample usage: "Page <pagenumber/> of <pagetotal/>" results in "Page 1 of 10" (for example).

b. Evaluation Functions

GetXml—The GetXml function takes one argument (a string) and returns an Xml type element. Normally used with the getPage or getPageContents functions that require an Xml type element.

GetPage—The GetPage function takes two arguments (an Xml type and a number), and returns the appropriate page element from the provided xml element.

GetPageContents—The GetPageContents function behaves similarly to the getPage function, but it returns the contents of the page element, not the page element.

ListLen—The ListLen function takes two arguments (both strings, the first is a delimited list and the second is the delimiter) and returns the number of elements.

ListGetAt—The ListGetAt function takes three arguments (a delimited list, a number, and an option delimiter specifier) and returns the appropriate item.

Replace—The Replace function takes three arguments (all strings, the first is the text, the second is the search text, and the third is the text to substitute).

FindNoCase—The FindNoCase function takes two arguments (both strings, the first is the text and the second is the text to search for). The function returns the location of the search text, 0 upon failure.

DollarFormat—The DollarFormat function takes one argument (a number) and returns a string that includes a "$" symbol, two decimal places, and a thousands delimiter (if necessary).

Today—The Today function takes no arguments and returns today's date (and time) as a date type element.

DateFormat—The DateFunction function takes two arguments (a string and a date) and returns a formatted date as string. Examples: Dateshort=11/1/2006; Dateformal=Nov. 1, 2006; Dateformallong=Wednesday, Nov. 1, 2006; Time=4:37 PM; Datetime=11/1/2006 4:37 PM.

3. Composition (Proprietary)

a. Tags

The Composition tags provide a framework for the flexible handling of a variable amount of content.

<content>—For example, <content>. Content denotes the content that is to be flowed through one or more templates.

<flowingcontent>—For example, <flowingcontent>. FlowingContent tags designate one or more pages of output that will be the result of flowing content through one or more templates. The content is contained in Content element and is required. Also required is a FlowingPage element or a UseFlowingPage element.

<flowingpage>—For example, <FlowingPage height="792" width="612" id="header">. FlowingPage defines a page-sized template that content is flowed through and, if sufficient content exists, is reused on additional pages. The FlowingPage element contains at least one FlowingSection element. The FlowingPage tag can be used in two different configurations: a) Outside a FlowingContent tag. The FlowingPage is defined once in the packet and potentially reused in different FlowingContent by means of the Use-FlowingPage tags. In this usage, the Id attribute is required. b) Inside a FlowingContent tag. The FlowingPage appears inside a FlowingContent tag and is coupled directly to the Content tag and its elements. In this usage, the From and To attributes are required. Required Attributes—height, width. Optional Attributes—Id (Identifies the FlowingPage element for subsequent calls by the UseFlowingPage); From (Controls on what page the template should be used. Values are first, last, 2, 3, 4, etc.); To (Controls on what page the template should be used. Values are first, last, 2, 3, 4, etc.).

<flowingsection>—For example, <FlowingSection width="100%" height="100%"/>. FlowingSection defines a rectangular area that the content is to flow through. The height and width of the element are defined either explicitly or as a percentage.

<useflowingpage>—For example, <UseFlowingPage id="header" from="first" to="last"/>. The UseFlowingPage tag enables a FlowingPage to be defined once at the beginning of the packet and reused in multiple FlowingContent elements. Attributes—Id (determines the FlowingPage element to use); From (Controls on what page the template should be used. Values are; first, last, 2, 3, 4, etc.); To (Controls on what page the template should be used. Values are; first, last, 2, 3, 4, etc.).

<repeatreset>—For example, <repeatreset/>. The Repeat-Reset tag is used in conjunction with the Repeat attribute in the flowed content. The repeat attribute, described below, designates content that should be repeated when a content flow occurs. The RepeatReset tag is placed in the content stream between logical sections, where the previous repeat rules should be disregarded.

b. Attributes repeat—The repeat attribute designates content that should be repeated when content flow occurs. It also designates content that should appear only once. Valid tags=div, table. Values: Always (content will appear on the first and every subsequent page); First (content appears on only the first page); Next (content appears on only the second and subsequent pages).

nobreak—The nobreak attribute designates content that should not be divided in two. This forces the entire element and its content into the next section or page.

c. Example

```
<FlowingPage height="792" width="612" id="header">
    <style>
        .Helv7 { font-family: Helvetica; font-size: 7; color: 0,0,0,1; }
    </style>
    <div style="position:absolute; top:40; left: 40; width:532; height:712;">
        <img src="CooperSquareHeader.eps" width="90" height="54" />
        <FlowingSection width="100%" height="100%" />
    </div>
</FlowingPage>
<FlowingPage height="792" width="612" id="important">
    <style>
        .Helv7 { font-family: Helvetica; font-size: 7; color: 0,0,0,1;
        }
    </style>
    <div style="position:absolute; top:40; left:40; width:532; height:712;">
        <img src="CooperSquareHeader.eps" width="90"
            height="54" />
        <FlowingSection width="100%" height="100%" />
    </div>
</FlowingPage>
<FlowingContent>
    <UseFlowingPage id="header" from="first" to="last" />
    <Content>
```

-continued

```
        <div class="HelvNeu20">The 400 Central Park West
Condominium - Purchase Application</div>
            etc . . .
        </Content>
    </FlowingContent>
    <FlowingContent>
        <UseFlowingPage id="header" from="1" to="1" />
        <UseFlowingPage id="important" from="2" to="last" />
        <Content>
            <div class="HelvBold9">Important Information (Please read
carefully before completing your application)</div>
            etc ...
        </Content>
    </FlowingContent>
```

4. Imposition (Proprietary)

a. Tags

Imposition tags map content to physical pages. For example, the Page tag maps content in a 1-to-1 relationship with the physical page.

i. Book

For example, <book pagesPerVolume="486">. The Book element handles bound books. Optional Attributes—The pagesPerVolume attribute is the maximum number of pages of content that can fit before a second volume is required. Elements contained:

<cover>—For example, <cover height="864" width="1296">. The Cover element creates the book cover. Books of varying numbers of pages require spines of different sizes. The Cover tag and its contained tags, Front, Spine and Back, handle the dynamic sizing. If the number of pages in the Pages element exceeds the pagesPerVolume attribute in the Book element, the Cover element is repeated for each volume. Attributes—Height and Width (paper sheet). <front>—For example, <front height="792" width="612">. The Front element creates the book front. Artwork that is to wrap around to the spine should be placed in this element. The wrapping artwork should be placed in an absolute-position div with a negative left value. Attributes—Height and Width (logical page). <spine>—For example, <spine pagesperinch="525" height="792" width="612">. The Spine element creates the book spine. Artwork that is to wrap around to the spine should be placed in the Front element. The contents of spine are automatically rotated 90 degrees clockwise and constrained vertically by the width of the book. Required Attributes—Height and Width (logical page) and PagesPerinch (set to 525). Optional Attributes—pagetotal. (Normally, the spine's width is determined by the number of pages in the pages section. Use the pagetotal attribute to override this.) <back>—For example, <back height="792" width="612">. The Back element creates the book back. Attributes—Height and Width (logical page).

<pages>—For example, <pages>. The Pages element contains the guts of the book (e.g., one or more Page elements and/or FlowingContent sections).

<volumedivider>—For example, <volumedivider>. The optional VolumeDivider element contains Page elements that are included if the book requires multiple volumes.

ii. Folder

For example, <folder height="896" width="1296" mediacolor="White" logicalPageWidth="612" logicalPageHeight="792">. Folder supports the folder print product. The Folder tag surrounds two Page elements, right and left (in that order). Required Attributes—height, width, logicalpageheight (the height of the contained pages), logicalpagewidth (the width of the contained pages), duplex. Optional Attributes—MediaColor.

iii. Newsletter

For example, <Newsletter height="792" width="1224" duplex="true" mediacolor="Newsletter" logicalPageWidth="612" logicalPageHeight="792">. The Newsletter tag is wrapped around an even number of Page tags. The Page tags are provided in logical order, where the last page of content is the last Page element. The last and first Page elements appear on the first imaged sheet. When the sheet is bigger than the provided pages, cut marks are automatically provided and bleed accommodated. Required Attributes—height, width, logicalpageheight (the height of the contained pages), logicalpagewidth (the width of the contained pages), duplex. Optional Attributes—MediaColor.

iv. Page

For example, . The Page tag provides 1-to-1 imposition. Required Attributes—height, width, duplex. Optional Attributes—MediaColor, [Src and Type] (to include a PDF of one or more pages, use the page tag and src attribute pointing to the PDF and a type attribute set to 'pdf').

v. TwoUpImposition

For example, <twoupimposition height="792" width="612" mediacolor="White" logicalPageWidth="612" logicalPageHeight="792">. TwoUpImposition supports letter-size newsletters. It is more cost-effective to print the letter-size documents two across on a 12"×18" sheet and then cut them in two later. The TwoUpImposition tag surrounds two Page elements (front and back). When the sheet is bigger than the provided pages, cut marks are automatically provided and bleed accommodated. Required Attributes—height, width, logicalpageheight (the height of the contained pages), logicalpagewidth (the width of the contained pages), duplex. Optional Attributes—MediaColor.

b. Attributes duplex—Duplex controls whether the printer prints on both sides of the physical sheet. Values=true.

logicalpageheight—LogicalPageHeight is the height of the content specified in points, generally 792. Values=number.

logicalpagewidth—LogicalPageWidth is the width of the content specified in points, generally 612. Values=number.

mediacolor—MediaColor is a Xerox Document Services Platform (DocuSP) term. Each input tray of a DocuTech printer is assigned a color representing the paper stock that has been loaded. The MediaColor specified in the imposition tag is transmitted to the Xerox device in the print stream. Values=examples, White=white; Newsletter=11"×17" preprinted newsletter shell.

5. Data Document (Proprietary)

The purpose of data documents is the efficient, fast printing of data-driven documents. A data document comprises one or more documents (contained in separate jobRequest.document elements) and a data element. Each document is given a unique key. The record elements that make up the data reference a document using this key. Additionally, an optional Templates section can be provided that provides a globally available set of variables.

A data document is processed in the following manner: 1) Each document is loaded into memory. 2) Each template is loaded into memory. 3) Each record is processed as follows: a) The records doc attribute is accessed. b) The matching document is pulled from memory. c) The document is processed for variables. d) One or more sheets is output for the record.

a. Tags

<records>—The records tag contains one or more rec elements.

<rec>—For example, <rec doc="doc.one">. The rec tag contains one or more custom data elements, determined by the packet writer. Each data element can contain any amount of VPML, including tables and divs. Attribute—doc (the identifier of the document to be used as a template for that record).

<templates>—The templates element is optional and, if present, contains one or more template elements.

<template>—For example: <template name="productA"><div>We think this product is perfect for you, <variable name="username"/></div></template>. The template element can contain any amount of VPML. It can also contain variable elements.

b. Attributes variable—For example, <div variable="product" style="width: 380px;top: 202px; height: 25px;left: 215px; position: absolute;"></div>. The variable attribute is used inside a document to indicate where variable content should go. The variable attribute can be assigned to a div or a td. The element should have a specified height and width. In a template, the variable element is used and not the attribute.

c. Example

```
<?xml version="1.0" ?>
<!DOCTYPE jobRequest SYSTEM "file:/job-request.dtd">
<jobRequest>
    <job queue="NL_Print_BW" quantity="1" priority="100"
autoProcess="false" autoComplete="false"/>
    <information> . . . </information>
    <document key="doc.one">
        <content><![CDATA[
            <Newsletter . . . >

<div variable="product" style="width:
                        380px;top: 202px; height: 25px;left:
                        215px;position:
absolute;"></div>

. . .
            </Newsletter>]]>
        </content>
    </document>
    <document key="doc.two">
        <content><![CDATA[
            <Newsletter . . . >

<div variable="greetings" style="width:
                        380px;top: 202px; height: 25px; left:
                        215px;position:
absolute;"></div>

. . .
            </Newsletter>]]>
        </content>
    </document>
    <records><![CDATA[
        <templates>
            <template name="productA">
                <div>We think this product is perfect for you,
<variable name="username"/></div>
            </template>
        </templates>
        <records>
            <rec doc="doc.one">
                <username>John Smith</username>
                <product><variable name="product A"/></product>
            </rec>
            <rec doc="doc.two">
                <username>Jim Gardener </username>
                <product><variable name="productA"/></product>
            </rec>
```

-continued

```
        </records>]]>
    </records>
</jobRequest>
```

APPENDIX B

Exemplary Business Application—Magazines

As used herein, the term "provider" refers generally to any individual or entity providing the present system as a service to users or subscribers thereto. As used herein, the terms "user" and "subscriber" refer to any individual or entity to whom a provider is providing the present system as a service. The terms "user" and "subscriber" are used interchangeably herein.

In one embodiment, a web-based client/server application enables user-creation of a custom publication, such as a magazine. The client application enables a user, or subscriber, to access a website via a web browser (user client 140), where the user can log in to gain access to the online publication production system. A web server (web front-end 500), or host system, handles requests from the browser. The server-side components of the system process requests, store data, and store files. In one aspect of the present method described below, the server-side elements utilize the ColdFusion and Java programming languages for processing requests, an SQL server database for data storage, and a file server for file storage. It is contemplated, however, that any suitable programming languages, databases, or methods of file storage may be used without departing from the scope of the present invention.

The description below addresses the following steps: 1) account creation; 2) configuration; and 3) online editing of the publication. Each of these steps is now described briefly, with further details provided as the system is discussed in more detail below.

Account creation is the process by which a user or subscriber establishes an account and gains access to the present document editing and creation system. Account creation may take place by any of a variety of methods currently known in the art. For example, a potential user may establish an account by phone, working with a representative of the provider to set up payment options, authorizations, passwords, and the like, and to provide user-identifying information to the provider. The representative of the provider may then manually set up and activate the user account and provide the user with the pertinent information needed to log on to and make use of the account. Alternatively, creation of a user account may take place entirely online, wherein the user logs on, for example, to the provider's web site and follows the instructions there, relaying to the provider the pertinent billing information, passwords, authorizations, and other information needed to create the account. The account may then be created automatically by the provider's computer system, or may be created manually by a representative of the provider after the representative has reviewed the information provided by the user. Any suitable method of account creation may be used without departing from the scope of the present invention.

Configuration of the user's account and the publications to be produced may also be conducted in a variety of ways. For example, configuration of the account may be done primarily over the Internet by the user, or by a representative of the provider communicating with the user by telephone, email, online chat, instant message, and the like. It is contemplated that a representative of the provider may meet with the user in person in order to determine the user's needs, and thus the properties of the publication the user will be producing, so that the appropriate template (described more fully below) will be associated with the user's account. Configuration may also deal with such aspects of the present system as distribution methods and formats for providing the final product to the user and the various styles that will be associated with the user's publication.

Online editing is, from the user's perspective, the primary means by which the user's document is customized and created. The user or subscriber communicates with the web front-end 500 using the user client 140. The web front-end 500 then provides the user with access to functionality of the present system adapted to enable the user to create a magazine or publication. The user may view content, both user-created as well as that provided by the provider, purchase additional sections of a publication for user-created content, and incorporate specific content into the publication (such as background art, nameplates, banners, images, customized calendars, StoryFiles, headlines, and the like). The user may also manage images and content maintained in various libraries accessible to the user. Finally, the user may preview the publication prior to releasing it to be produced and distributed.

Generation of the final publication is performed by the distribution utility 120, as well as by representatives of the provider, and includes broadly the steps of document processing and distribution. For example, the provider's document processor 210 (described above), converts the formatted output (packet 130) of the online editor, used by the user to create and customize the publication, to digital or printed output. Once the user has submitted her publication, it may be edited or proofed by the provider and then passed along to the distribution utility 120 (described above). The distribution utility 120 is responsible for production of deliverable final documents. It manages, for example, print jobs, devices, tracking of jobs, confirmation of production and post-production procedures, and the like. The professional-quality, custom publications created by the user may then be distributed (e.g., to the user or to the user's customer, to whom the publication is targeted).

Thus, the present system enables production of custom and unique publications that are of professional quality. The publications are produced by the user in a manner easy and intuitive for those with little design skills or computer expertise. Final documents are then processed and generated by the provider and the quality publications are distributed.

The various aspects of the present system will now be presented in greater detail by reference to an exemplary Internet-based embodiment of the present system.

As noted above, the present system can be divided broadly into component portions. For purposes of the detailed discussion presented here, the "account creation" portion mentioned above will not be discussed further as various methods of creating online user accounts are well known in the art and any such suitable method may be used in conjunction with the present system. Thus, for purposes of detailed discussion of an exemplary embodiment of an Internet-based aspect of the present system, the various broadly-defined components of the present system are as follows: I) System setup and configuration, wherein the infrastructure and configuration of the present system is adapted for the specific requirements of an individual subscriber as she sets up her account; and II) the user interface, by which means an individual subscriber is able to generate custom publications using the present method. Document processing (by which the publication created by the subscriber via the online interface is converted to a professional-quality publishable document) and distribution (by which a deliverable final publication is produced and distributed) were discussed above and will not be addressed further.

I. System Setup and Configuration

The present method relies on the infrastructure and configuration described below. The individual settings of these various components control the behavior and output of a magazine throughout the creation, submission, and distribution processes (described below). Many of the setup and configuration features of the present invention are customized at the point of subscriber account creation. Thus, the specific settings and configuration used with respect to a subscriber account are customized to the needs of that subscriber. In one embodiment, the various settings, features, and components of the present system described below remain under the control of the provider. In that way, these aspects of the present system remain in the background, from the point of view of the subscriber, and do not provide additional steps that must be undertaken by the subscriber. This ensures that the simplicity of the system, again from the point of view of the subscriber, is maintained. It is, however, contemplated that any or all of the following settings, features, and components of the present system could be placed under the control of the subscriber.

a) Template

A template is a control element for settings related to magazine configuration, design, access, usability, and output. The template includes a number of settings relevant to the publication creation process. Exemplary aspects of the template, as provided in one aspect of the present invention, are set forth below. In one embodiment, a subscriber is assigned (or is able to choose) a particular template at the time of account creation. This template will then be used when a new magazine is generated. Though the subscriber may switch templates if desired, in one embodiment, the subscriber consistently uses the same template in order to provide a final product that is consistent in general layout, look, and feel. The template chosen determines the level of customization available to the user.

Table 1 provides a listing of exemplary template settings that are associated with a template. In one embodiment, the provider is able to access template settings by, for example, use of a web browser, and will then be able to make modifications to the settings as necessary. It is contemplated, however, that any suitable method of accessing and modifying values for various templates may be employed. These exemplary template settings are described in further detail below.

TABLE 1

| Exemplary Template Settings |
| --- |
| Template Name |
| Template Code |
| My Photos |
| Background |
| Blank Pages |
| Print Queue |
| Mailing Queue |
| Job Ticket Queue |
| Impression Count |
| Template Status |

The "Template Name" serves to identify a given template and distinguish it from other templates that may exist on the same server or elsewhere. Generally, pre-made templates are provided by a provider of the present system in order to simplify the magazine creation process. Thus, the template name is chosen by the provider of the template in question. Template names may be such that they are of significance to a particular subscriber, but in one embodiment, templates may be used by multiple subscribers, and template names provide some information about the template itself to the provider, who is responsible for maintaining the template and assigning the settings thereof.

The "Template Code" is an alphanumeric identifier used to identify the template internally. The template code is used for file and folder naming purposes, as well as for reporting purposes. Any suitable system of assigning alphanumeric codes to templates may be employed, and providers of the present system may implement methods of assigning Template Codes that best comport with their own needs and practices.

The "My Photos" setting determines whether a user has access to the My Photos feature of the present method, described more fully below. This feature enables a user to incorporate full-color photographs or other images into a magazine during the magazine development process. When a given template is set such that a subscriber has access to the My Photos feature of the present system, then subscribers who are using that template will be able to access this feature. Likewise, if a given template does not allow access to the My Photo feature, users of that template will not be allowed access to the feature.

The "Background" setting enables or disables the printing of background art in a publication created by the present method. The Background Art feature of the present system is described more fully below.

The "Blank Pages" setting determines whether pages will be skipped when printing a publication created with the present method or when creating a PDF file of the same publication.

The "Print Queue" setting determines which print queue will be used to print a magazine created using the present method, while the "Mailing Queue" setting determines which mailing queue is used when a magazine is printed and mailed, and the "Job Ticket Queue" setting determines which job ticket queue is used when the magazine job ticket is printed. Use of settings related to print, mailing, and job ticket queues are exemplary. It is contemplated that any suitable method of assigning such queues may be utilized without departing from the present method, and in some aspects of the present method these settings may be assigned to a particular template or publication at the time of fulfillment, according to the needs of the distribution utility.

The "Impression Count" setting identifies the number of impressions needed in order to print one magazine. This control is useful to the provider for reporting and accounting purposes.

The "Template Status" setting determines whether a given template is active and available for customer use. Templates that are designated as "active" may be assigned to or chosen by subscribers upon activation of a subscriber account. Templates that are designated "inactive" will not be available for use with new subscriber accounts.

A template having some or all of the settings or features described above is used for the creation of a magazine utilizing the present method. These templates may be provided by a provider of the present system or may, alternatively, be created by an end user of the present method. Further, an individual template may have multiple versions, reflecting changes to the template over time. A "template version" setting may be used to manage different versions of a "template node" (described more fully below) for a single template. Providing the template version setting enables past magazines created by a system employing the present method to function correctly while at the same time allowing changes to the template node structure for future issues. The "template version" setting may include, for example, a "template" identifier that identifies the template being used for a given template version, a "template version" identifier to identify the template version itself, a "version number" identifier to specify the numerical version of the template, and a "current version" control to determine whether the template version is the current active template.

b) Template Node Structure

Template layout is managed by use of the Template Node Structure function. The Template Node Structure includes, among other things, the number of pages in the template as well as the layout of the sections within a page. The Template Node Structure is a hierarchical tree-based structure in which pages are root nodes and sections are child nodes of the various pages. The template layout structure is managed with a visual tree model, where sections and pages can be inserted after (in the case of a new node on the same tree level), inserted inside (in the case of a child node on a lower tree level), moved up or down (such as with section or page swapping), or removed entirely.

Figure 7:
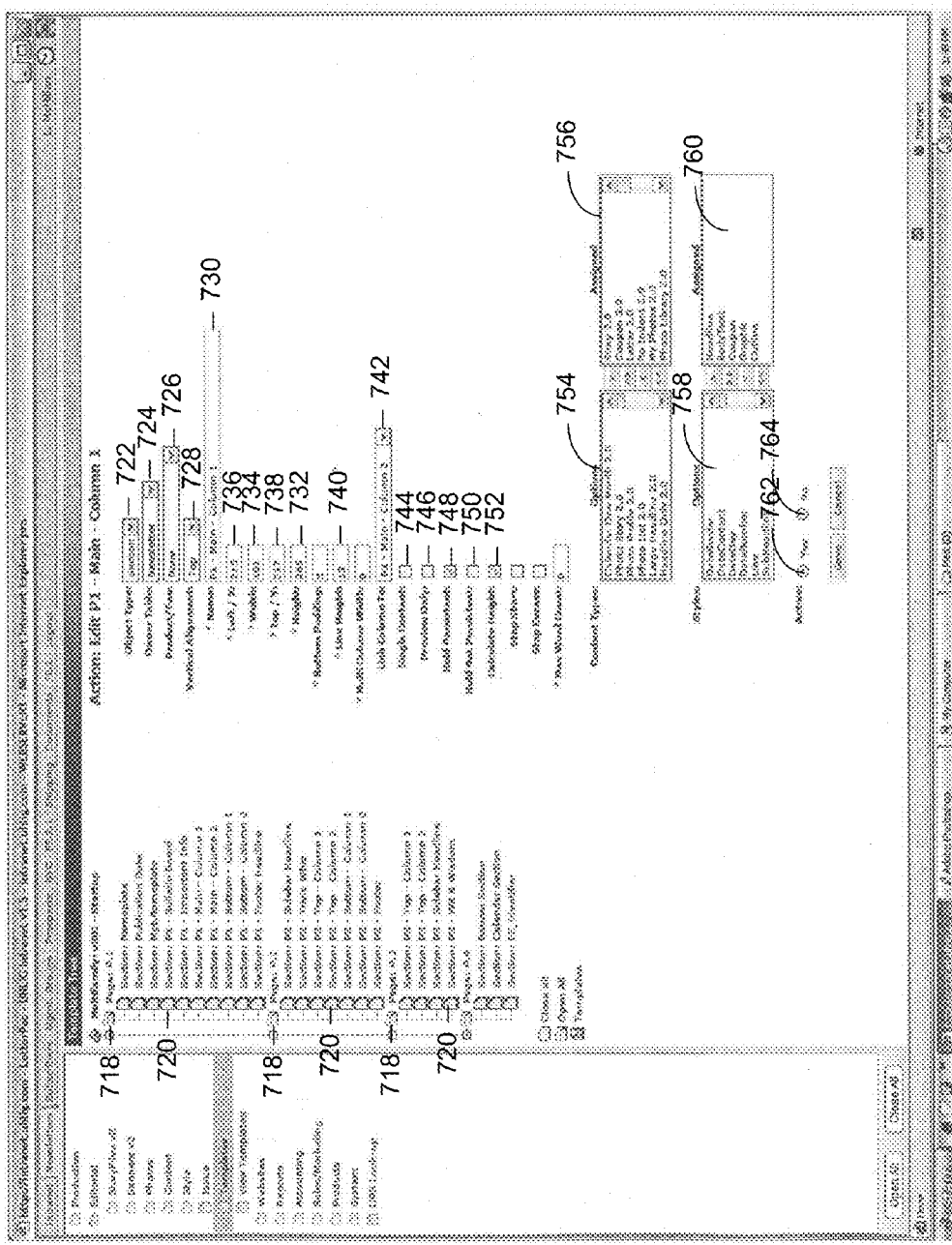
FIG. 7 illustrates a user interface for managing a Template Node Structure, according to one embodiment of the invention.

FIG. 7 illustrates a user interface for managing a Template Node Structure, according to one embodiment of the invention. As can be seen in FIG. 7, the Template Node Structure includes individual pages 718 (and thus a count of the overall number of pages within a template). A page node is further divided into sections 720 that represent sections of the template to which content may be added. When a section 720 is selected, various settings related to that section, as seen in the right-hand column of FIG. 7, are available for modification. Likewise, if a page 718 is selected, settings related to that page are provided onscreen and may be modified as desired by a provider.

Thus, the configuration of the Template Node Structure is determined by a number of settings subject to modification by a provider. These settings allow for a high degree of customization of the Template Node Structure. In one embodiment, subscribers do not have the ability to access the Template Node Structure, particularly in instances in which single templates are used for multiple subscribers. In some aspect of the present invention, wherein individual templates are assigned only to single subscribers, it is contemplated that the subscriber may have access to the Template Node Structure for that template, thereby having the ability to make changes to the template itself. The settings shown in FIG. 7 apply to a section entitled "Main—Column 1" of page "P.1" of the template being modified.

The "Template Node Type" setting determines whether the node is a section or a page. Pages are higher-level objects in the Template Node Structure than are sections, with a page possibly having multiple sections included therein. In FIG. 7, the Template Node Type is given by the value of a drop-down menu 722.

The "Owner" setting determines who controls or owns the node and is therefore used to control who can edit the content inside of the node. An "owner" as used with respect to objects employed by the present system is not necessarily an individual or entity, whether a provider or subscriber. Rather, in one embodiment, the "owner" of a given object is another object. By utilizing an owner model, the present system is afforded greater flexibility because the various components of the system are able to behave differently under different owner models. Exemplary "owner" objects in the present system include, but are not limited to, magazines, issues, templates, and the like.

For example, page nodes may be designated as being owned by the issues, or may be designated as being owned by the template. With respect to page nodes for a given template that are owned by the issue, a provider provides new content for that section of a template with every issue or cycle of the publication. On the other hand, if a particular page node is owned by the template itself, then the content for that section of a template need only be generated once. It is persistent content within that template.

The owner model extends to content as well. For example, content that is owned by an issue cannot be replaced by a user unless the user first purchases the section node containing that content. Conversely, content owned by the staff can either be used as written by the staff, or may be replaced with alternative content generated by the user. In the event of content owned by the magazine (i.e., wherein the magazine is the "owner" object), the content is user-generated and may be reused in future issues of the publication.

The specific method of naming and relating owners and objects described above is exemplary only. The specific names of various owner objects may be altered, and the implications of ownership by a given object may also be modified to meet the needs of any given situation. As shown in FIG. 7, the "Owner" setting is presented by the value of drop-down menu 724.

The "Product/Fee" setting determines whether a fee is charged for use of a section. In instances in which fees are associated with sections, the present system may alert the user to the fee and provide the user with the opportunity to agree to the fee prior to adding content to the section during the editing and creation process. If no fee is associated with the content provided with a particular section, then the user may freely add the content to that section. As shown in FIG. 7, the Product/Fee setting is presented by the value of drop-down menu 726.

The "Vertical Alignment" setting determines the alignment of the content in the node, such as, for example, aligned to the top, middle, or bottom of the node. Because this is a template setting, it provides for a consistent appearance of text or images within a section across various issues of a publication. As shown in FIG. 7, the Vertical Alignment setting is set via drop-down menu 728.

The "Name" identifier is used to identify the node itself during use of the online editor. As shown in FIG. 7, the name setting is set via use of text box 730. The name entered into text box 730 is reflected in the left-hand column of the Template Tree as the name of a corresponding page or section.

The "Height" setting specifies the pixel height of the node, which is used to aid in the determination of coordinates for drawing the node. Likewise, the "Width" setting specifies the pixel width of the node, which is also used to aid in the determination of the coordinates for drawing the node. As shown in FIG. 7, the Height and Width settings are set via text boxes 732 and 734, respectively.

The "Left 'X'" setting is used to set the absolute horizontal position of the top left corner of the node. This, in turn, determines coordinates for drawing the node. As shown in FIG. 7, the Left X setting is set via text box 736.

The "Top 'Y'" setting is used to set the absolute vertical position of the top left corner of the node. This is also used to determine the coordinates for drawing the node. As shown in FIG. 7, the Top Y setting is set via text box 738.

The "Line Height" setting specifies the pixel height of one line of content within the node. This information is used by the Document processor to determine how much additional content will fit into a given section. As shown in FIG. 7, the Line Height setting is set via text box 740.

The "Link Column To" setting determines whether the node in question links to other nodes. This is used by various sections of the editor when creating multi-column sections. In the situation wherein two or more section nodes are linked, content provided in a first section will automatically continue ("flow") into the linked section when the available space for content in the first section is exceeded. As shown in FIG. 7, the Link Column To setting is set via drop-down menu 742.

The "Single Content" setting, when checked, limits the section to allow only a single content element to be placed within a node. As shown in FIG. 7, the Single Content setting is set via checkbox 744.

The "Preview Only" setting determines whether content within the node is editable or is viewable only. If the Preview Only setting is checked, the user is prevented from editing any of the content within the node. As shown in FIG. 7, the Preview Only setting is set via checkbox 746.

The "Hold Persistent" setting allows the node to use any persistent content available to the node. The persistent content may, for example, be reused automatically on a monthly basis, or on any other cycle over which the publication is produced. As shown in FIG. 7, the Hold Persistent setting is set via checkbox 748.

The "Hold Not Persistent" setting prohibits the node from using any persistent content. This control functions by sending instructions to the Content Module not to display the "Reuse Content" option to the user. Thus, with each cycle of publication, new content will appear within a section node having this setting. As shown in FIG. 7, the Hold Not Persistent setting is set via checkbox 750. In one embodiment, when checkbox 750 is checked, the present system automatically unchecks checkbox 748, and vice versa.

The "Calculate Height" setting determines whether the pixel height of the content should be calculated for a given node. The Document processor makes use of this information to determine how much additional content will fit into a section. The results of this determination can be displayed to the user during editing of a publication so that the user provides the correct amount of content for the section. As shown in FIG. 7, the Calculate Height setting is set via checkbox 752.

The "Content Modules" setting determines which content modules are allowable within a given node. Various content modules may be supplied by a provider. An exemplary, but not exhaustive, list of content modules include standard stories, two column lists, two column dots, letters, coupons, photos, stories from a StoryFile Library, Staff-Written articles, and content from previous issues. These content modules are explained in more detail below. As shown in FIG. 7, the options available as Content Modules for a specific section are provided in list form in list box 754. A provider may select from among the options available by double-clicking members of the list. Once available options are selected, the options are displayed in list box 756.

The "Styles" setting determines which CSS styles are applied to a given node. In one embodiment, CSS styles are set by the provider and applied to a template such that consistent styles are used across issues of a given publication. Configuring the various styles available to a section is described more fully below. As shown in FIG. 7, the options available as Styles are provided in list form in list box 758. A provider may select from among the options available by double-clicking members of the list. Once available options are selected, the options are displayed in list box 760.

The "Active" setting determines whether a given node is active or inactive. As shown in FIG. 7, the Active setting is set via radio buttons 762 and 764.

The various settings described above with respect to template nodes, such as a page or section, are exemplary only and are not intended to limit the scope of the present invention. In addition to the settings described above and/or shown in FIG. 7, various other settings may also be employed, and such settings will be apparent to those of skill in the art upon reading this disclosure.

c) Issue

Issues can be considered as per-cycle customizations of the template and template node characteristics described above. One issue is created per template cycle. Each issue has a distinctive appearance, which is determined by the styles, classes, colors, and images used with respect to that particular issue. The separation of various aspects of the present system into issues, templates, and template nodes enables a user to create a custom magazine from the ground up.

An issue may have a variety of settings or objects associated therewith. Table 2 provides an exemplary listing of settings or objects that may be associated with a given issue. These settings and objects are explained in greater detail below.

TABLE 2

Exemplary Issues Settings and Objects

Template
Issue Name
Publication Date
Release Date
Issue Styles
Images
Monthly Features
Staff-Written StoryFiles
Issue Content
Staff-Written Content The "Template" identifier simply identifies which template a given issue is using. Though from the user's perspective, the template may be consistent with respect to every issue, the template identifier allows the provider to easily ascertain which template is in use for a given issue of a publication by a given user.

The "Issue Name" identifier corresponds to a name provided, for a given issue, by a user or provider.

The "Publication Date" of an issue identifies the date on which an issue is scheduled to be published. This date may be chosen by a user, reflecting the user's need for a particular publication date, or may be set automatically by the present system, reflecting an anticipated publication date based on the number of jobs in the system, number of devices available, and the like.

The "Release Date" of an issue identifies the date by which an issue will be "complete," and thus available for editing by the user. The release date allows a provider to create and complete future issues of a publication without yet releasing them to users. Any user assigned to use the template of that issue has access to a new magazine for the issue for the current cycle once the release date has passed.

Figure 8:
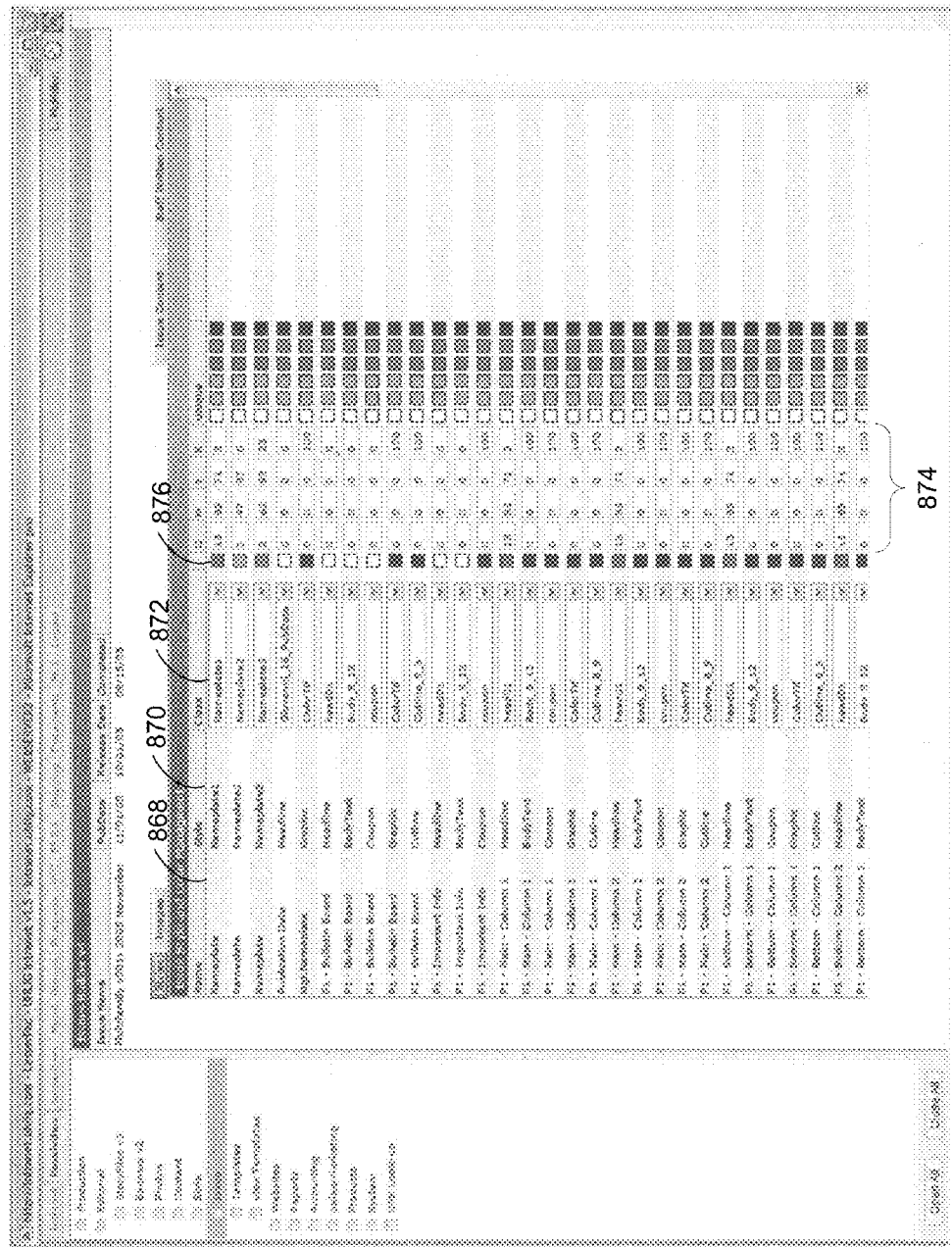
FIG. 8 illustrates a user interface for managing issue styles, according to one embodiment of the invention.

"Issue Styles" control the look and feel characteristics of the content of a given issue, such as the font, text size, text weight, color, background, and the like. Issue Styles for a given issue are managed together. FIG. 8 illustrates a user interface for managing issue styles, according to one embodiment of the invention. For a style in a section node of an issue's template, a class is assigned and a color chosen. Classes are selected, for example, by means of a drop-down menu 872 providing the available choices for that section node. Classes may include, for example, nameplate, head, body, coupon, cutline, and the like. Cyan Magenta Yellow Black (CMYK) colors may be assigned to a style (based on numerical values for each of the four colors) and a color preview made available. As shown in FIG. 8, the name of the node is given by field 868. The name of the style being used is provided by field 870. The Class for a given style is selected via drop-down menu 872. The CMYK values associated with a given style are shown collectively in FIG. 8 as item 874. Finally, the color created by the CMYK values is shown as a swatch in box 876.

Images for an issue are also managed together, with issue images being uploaded and made available to the magazine. These images are separated into two broad categories: 1) background art; and 2) issue content images.

Background art images are graphical designs displayed behind a magazine's custom content. A page of a magazine has its own background art per issue (provided the background art setting is enabled for the template from which the issue is generated). This background art is the same size as the template's page. A background art image is saved in a variety of formats, each intended for a specific use by the present system. These formats are designated, for example, Print, Archive, Preview, Proof, and Thumb. In one embodiment, print images are high-resolution PostScript image files, used to obtain maximum image quality when an issue is printing. In one embodiment, archive images are 72 dpi JPEG images designed for use in archive PDF files. In one embodiment, preview images are also 72 dpi JPEG image files, but differ from archive images in that they have been lightened to allow fast loading over the web, and to allow increased visibility of customized content when displayed in the Page View (described below). Proof images are 72 dpi JPEG images that include a watermark or other marking bearing the words PROOF prominently thereon. In one embodiment, proof images are used in PDF previews, in order to deter distribution by a user of PDF files generated when the user uses the magazine proofing features of the present system. Thumb images are miniature JPEG images used for thumbnail navigation of images in the online editor.

"Issue Content Images" are of the images included in issue sections that are not available for editing. These images cannot be removed from an issue unless the user purchases the applicable section from the provider. The issue content images differ from issue to issue and are customized to match the style colors of a given image.

"Monthly Features" are banners created on a per issue basis. A new monthly feature may be provided for one-time use with a new issue of a publication. In one embodiment, banners are "camera-ready" images provided in EPS or GIF format.

"Staff-Written StoryFiles" are timely and unique stories provided by the provider for use in a subscriber publication. In one embodiment, they are configured on a per-issue basis, with new StoryFiles added to an issue at each cycle. Once the provider has configured the Staff-Written StoryFiles, the StoryFiles are made available to the issue, and to the user via the online editor described below.

"Issue Content" includes timely and unique stories provided by the provider for use in a subscriber publication. In one embodiment, they are configured on a per-issue basis, with new Issue Content added to an issue at each cycle. Once the provider has configured the Issue Content, it will appear in the Issue Content owned nodes within the online editor described below.

When a new issue is created, Issue Content is filled in for section nodes owned by the Issue Content. Staff-Written Content is filled in only if the user chooses to create a Professionally Written Newsletter rather than a Blank Newsletter. Issue Content cannot be replaced unless the section is purchased for an additional fee, while Staff-Written Content can be replaced without incurring any additional charges.

Using the user interface (also referred to herein as the "online editor"), a user of the present method is able to edit content provided within the user's template in order to create the current issue of the magazine. The present method is designed to make editing and customization of a magazine template as easy as possible.

Content Modules are individual modules provided by a provider that allow for the creation and editing, storage, web view, search view, and output format of a packet 130 (specifically, a document portion of a packet 130). Content modules are designed to accept a variety of user data in a user-friendly fashion and to output it into a professionally-formatted publication. The content is formatted by section, based on the issue step. Individual content elements retain the formatting (such as bold, italic, alignment, and the like) provided by the user during content creation.

In one embodiment, the document portion of a packet 130 is an XML representation of the individual form fields used in a Content Module form, including the HTML generated by a WYSIWYG HTML editor.

The term "Content Element" is used to describe the individual portions of content created by the customer through the use of a Content Module.

While various Content Modules are provided in conjunction with the present system, in one embodiment, each of the Content Modules provided uses the standard functions set forth in Table 3, below.

TABLE 3

| Content Module Standard Functions |
|---|
| Form |
| Empty Packet |
| Make Packet |
| Editor HTML |
| Search Results |
| Print Packet |
| Get Form Fields |

The "Form" function is utilized to build the HTML data entry form used by the user to add or edit Content Elements that are a portion of the overall publication. Form elements may include such items as text boxes, list boxes, checkboxes, radio buttons, and any other HTML form elements. When a user is adding content, the Form function uses the Empty Packet function (described below) to set the form field defaults. When a user is editing content, the Form function uses the document portion of a packet 130 to set the form fields.

The "Empty Packet" function creates an empty document portion of a packet 130 to which the user may add content. Once content is entered into an empty document portion of a packet 130, the Make Packet function (described below) is used to produce a document portion of a packet 130 that contains content which may be stored in a database and can be retrieved at a later time.

The "Make Packet" function converts data entered into an HTML form into a document portion of a packet 130 that will be stored in a database and ultimately used by other functions to convert the packet into its various input and output formats.

The "Editor HTML" function converts a document portion of a packet 130 into an HTML string that, when viewed within a web browser, provides a visual representation of what will ultimately becomes printed output for the final publication. In one embodiment, the HTML includes JavaScript code that provides the user with access to the functionality specific to the individual Content Module (which are described more fully below). In addition to, or instead of, JavaScript code, other suitable programming languages may also be used.

The "Search Result" function converts a document portion of a packet 130 into an HTML string for use in the Search View of the online editor (described more fully with respect to the user interface below).

The "Print Packet" function converts a document portion of a packet 130 into a VPML string for use by the document processor. In one embodiment, the VPML string is converted to a PostScript file, which is ultimately printed.

The "Get Form Fields" function returns a list of form field names used within a given Content Module. The list is used by a content/HTML validation tool that checks the entered content to verify that it is syntactically valid. If the content is not valid, the tool identifies the invalid content and attempts to remove it. After attempting to remove invalid content, the tool will validate the content once more. If the second validation also fails, this function will strip HTML tags from the content and return the user to the Form View so that the user can reformat the content in an acceptable manner.

It is contemplated that various desired Content Modules may be provided by a provider in order to add specific functionality to the present system. In an exemplary web-based embodiment of the present system, the exemplary Content Modules set forth in Table 4 may be provided.

TABLE 4

| Exemplary Content Modules |
|---|
| Text Modules |
| Special Formatted List Modules |
| Image Modules |
| Calendar Modules |
| Publication Date |
| Mailer Address |
| Banner Story w/Photo |

"Text Modules" are text-only content modules comprising, in one embodiment, two text-based form fields. The "headline" field allows the user to enter headline text, which will be displayed as bold text above a corresponding story. The "story" field uses a WYSIWYG HTML editor, in one embodiment with spell check, support for special character inputs, user text formatting such as bold, italic, alignment (left, center, or right), bullet list styles, and the like. By separating the headline from the corresponding story, the Text Modules ensure consistent format of output throughout an entire publication, while controlling and guiding the user experience.

Within the category of Text Modules are such exemplary modules as the "Standard Story," "Standard Story—No Indent," "Letter," "Coupon," and "Headline Only." The Standard Story module is used to create a headline in bold characters above indented paragraphs of text content. The Standard Story—No Indent module serves a similar function, except that there is no paragraph indentation on the first line of text. The Letter module outputs content in a letter format, with a headline, greeting, letter body, and closing. The Coupon module is similar to the Standard Story module, but includes a dotted or dashed line and padding around the output so as to create the appearance of a coupon that can be cut from the final publication. The Headline Only module is used to create only a bolded headline.

"Special Formatted List Modules" are used to allow the user to enter list data in a controlled fashion wherein it is easy for the user to achieve a final formatting or appearance that would be more difficult without the module. Examples of such Special Formatted List Modules include, but are not limited to, a Two Column List Module and a Leader Dot List Module. A Two Column List Module produces content that appears as two separate lists, one in each of two columns. In one embodiment, both columns are left-justified, and the total number of characters allowed in the left and right text fields is limited by the width of the section. The Leader Dot List Module is similar to the Two Column List Module, except that the right column is, in one embodiment, right-justified and leader dots appear between the left and right text elements. In one embodiment, a minimum of three dots is displayed between the left and right text elements. The total number of characters allowed in the right and left text fields is limited by the width of the section within which the content will be placed.

In one embodiment, Special Formatted List Modules adapted for use with the present invention share several common elements. For example, a Module may include a headline in the form of bold text appearing above the list. In one embodiment, two text fields are displayed in a list row, one on the left side of the row and one on the right side of the row. When text is entered into a first row, in one embodiment a third row appears on the screen, and this process continues when an empty row is edited. Thus, two empty rows will be displayed on the screen. Finally, in one embodiment, a row sorting functionality is added, possibly in the form of a series of arrows available to the right of a row. These arrows allow the user to move rows up or down without having to re-enter content in order to change the order of content in the list.

"Image Modules" function primarily to place images within content in such a way as to display them properly in the Page View as well as in the final printed product. Exemplary Image Modules may include "Background Art," "Nameplates," "Banners," and "Images." The Background Art Modules functions to place background art associated with a publication in the requested output format.

Nameplate Modules place a user or subscriber logo in the requested output format. The term "Nameplate" is used herein to describe user logos, possibly in EPS or GIF file formats. The EPS file is used for print and PDF output formats, and the GIF file is used on the Page View screen, which provides a browser representation of the magazine. In one embodiment, a Nameplate Module is a read-only Content Module that cannot be modified by the customer. In an exemplary web-based embodiment of the present system, nameplates are handled in a unique way. A user logo can be setup as a traditional EPS file, in which the appearance will remain constant or take on the colors of a particular issue such that the logo blends aesthetically with a given magazine or publication. This is achieved by specifying predefined CMYK color values, e.g., pink, in the EPS file. The style for the section, as defined in the issue setup, specifies the same predefined color values for substitution, such as pink=blue, red=green, and the like. Therefore, the output color of the pink areas within the EPS file will be output in blue. As the colors associated with a given style of the publication change, the colors associated with the nameplate change accordingly.

The term "banner" is used herein to described static "camera ready" art, possibly in EPS and GIF file formats. The EPS file is used for print and PDF output formats, while the GIF file is used on the Page View screen, which provides a browser representation of the magazine. In one embodiment, the Banner Module is a read-only Content Module that cannot be edited by the user. In one embodiment, banners are contained within a searchable Banner Library accessible by the user. In one embodiment, when a user searches a Banner Library, the user is presented with a 50% sized thumbnail, GIF, or JPEG image of available banner options. Once the user select a thumbnail, the banner packet is created and stored within the database.

In one embodiment, the Image Module is a unique, custom module that does not use the standard code and feature list for other Content Modules. When a user chooses to insert an Image, the user is presented with the images that have been uploaded to that user's "My Photo" library. The images are sized on the screen to be the same width as the section in which the user has selected to place the image. This ensures that the image file sizes transferred to the selection screen and the Page View are only as big as they need to be and represent the actual size they will appear when printed. When the image is printed, however, the full resolution image that was uploaded is used to ensure maximum print quality. In one embodiment, the user is provided with a WYSIWYG field in which the user can add a cutline to be associated with a particular image. The cutline may appear, for example, beneath an image in the final printed product.

"Calendar Modules" provide the necessary functionality for a user to add a calendar to a publication. Calendar Modules may be separated into "traditional calendars" and "mini calendars." If a user chooses to insert a traditional calendar, for example, the user may be provided with the option of inserting either a full page calendar, wherein a one-month calendar occupies the entire page of the publication, a ¾ page calendar, a ½ page calendar, or a two-month full page calendar, wherein a two-month calendar is printed on an entire page of the publication. If a user chooses to insert a mini calendar, the user may be provided with the option of inserting, for example, a two-month vertical calendar, wherein a two-month calendar is output on half a page, a three-month horizontal calendar, wherein a three-month calendar is output on half of a page, or a three-month vertical calendar, wherein a three-month calendar is output on an entire page.

In one embodiment, each of the Calendar Modules shares common functionality. Functions that may, for example, be provided with respect to Calendar Modules are included in Table 5, below.

TABLE 5

Exemplary Calendar Module Functionality

Add Date
Edit Date
Delete Date
Move +1 Day
Move −1 Day
Date Content Editing
Click Dates The "Add Date" function allows the user to add content to a selected date on the calendar. The "Edit Date" function allows the user to edit content previously added to a selected date on the calendar. The "Delete Date" function removes content from a selected date on the calendar. The "Move +1 Day" function allows the user to easily move content from the selected date on the calendar to the day after the selected date, while the "Move −1 Day" function allows the user to easily move content from the selected date on the calendar to the day before the selected date. The "Date Content Editing" function is similar to the editing of the WYSIWYG Story portion of a text-based Content Module, except that in one embodiment the Date Content Editing function does not allow for bulleted lists or alignment options. In one embodiment, the text is automatically aligned and formatted in accordance with the output format of the Content Module.

"Click Dates" are pre-written calendar content that is displayed to the user onscreen when the user is editing Date Content. When the user clicks on the pre-written text associated with a Click Date, it automatically inserts that text into the WYSIWYG editor. This feature saves the user time and allows the user to reuse the same content with a click of the mouse. While a user is editing date content, the user can click the "Save as Click Date" button, thereby saving the text and formatting that currently appears in the WYSIWYG editor as a Click Date for future use. In one embodiment, Click Dates are organized into three categories: 1) subscriber click dates; 2) seasonal click dates; 3) and approved click dates. Subscriber click dates include content the user has saved. This content can also be deleted by the user by clicking the delete icon. Seasonal click dates include pre-written seasonal text that is timely to a current magazine cycle. This content is provided by the provider and may not be deleted by the user. Approved click dates include commonly-used content that is available to a user or subscriber.

In one embodiment, the "Publication Date Module" is a read-only Content Module that displays a "Date Title" based on the publication cycle of a user. In one embodiment, the Date Title is configurable in a wide variety of output/display formats.

The "Mailer Address Module" may be provided if a user account is setup to allow that user's publications to be sent directly to specified mailing addresses. In such instances, this module is automatically added to a magazine by the present system. In one embodiment, when the publication is printed, this module outputs a United States Postal Service indicia, as well as the individual addresses to which the publication will be mailed.

The "Banner Story w/Photo Module" allows the user to select a photo from the "My Photo" library, and then enter a headline and story text. This content is then output in a specific format in the final publication. The photo is configured to consume a specific percentage of available width of the section in which this module is placed. Padding is added to include adequate space between the photo and story. The story text is provided next to the photo in the final publication.

Any or all of the Content Modules described above, or additional Content Modules used in conjunction with the present system, may have additional formatting and functionality as set forth in Table 6.

TABLE 6

Additional Content Module Functionality

WYSIWYG HTML Editor
Approved Headline
Special Characters
Reuse Content

The WYSIWYG HTML Editor is a tool used to format text content. The editor allows the user to enter text and make individual or groups of words bold, italicized, or underlined, and the like. In one embodiment, users can also control text alignment (right, left, or center) and convert paragraphs into bulleted lists. In one embodiment, the editor also provides a spell check function for the user.

"Approved Headlines" are pre-written headlines, provided by the provider, that are commonly used across multiple users and publications. When the user selects the pre-written text, that text is automatically inserted into the Headline form field. This feature saves the user time and allows the user to reuse the same statement with a click of the mouse.

A "Special Character" is any non-standard Roman character that does not appear on a keyboard and which has a special HTML code for display in a browser (Examples: © ®—Á Â Ã Å è é). These characters are traditionally difficult for a user to include in HTML content in WYSIWYG form because of the fact that HTML recognizes the characters only by a special code. By selecting a special character in the special character display area, the user can include that special character with content being added by the user.

"Reuse Content" is content that is marked as reusable by a user. Once a user marks content as Reuse Content, the next time a new magazine record is edited by a user for the first time, the content from the previous issue is automatically copied into the new publication in the same section. The feature overrides any Staff Written content that would have been placed in the section if a Staff Written magazine was selected on the first use of the current issue or magazine.

As noted above, in one embodiment, both StoryFiles and Banners are stored in libraries. StoryFiles are pre-written content that provides a user with text or text ideas for the user's magazine or publication. StoryFiles are the primary content entity of a magazine system. In one embodiment, StoryFiles are a combination of text and VPML utilized to create the desired output, and are produced using specialized forms that create and maintain the StoryFile formatting.

In one embodiment, banners are setup internally with respect to a provider of the present system, and may be associated with a unique Banner Code. An EPS file and GIF/JPG file is then placed in the banner code directory. Banner files are then assigned and uploaded to the appropriate owners and stored in the library. StoryFiles and Banners may be owned by single or multiple entities, and may also be associated with certain keywords to aid in further organization beyond the Owner model.

While the above provides a description of exemplary setup, configuration, and functionality provided to a user by a provider of the present system, it is contemplated that the above may be modified, removed, or various new functionality may be added, without departing from the scope of the present invention. Additions, deletions, and modifications to the above will be readily apparent to those of skill in the art upon reading this disclosure.

II. User Interface

As noted above, in order to use the magazine creation and editing system of the present invention, in one embodiment a user logs on to a web site established by a service provider providing the present method, thereby gaining access to the magazine creation and editing system. Though in the examples provided herein, the connection between the user and the present system is provided via the Internet, it is contemplated that any means of communication, including wireless communication along a dedicated network, could be employed to establish a link between the user's computer system (user client 140) and that of the provider (web front-end 500).

The user is provided with the tools, features, and underlying functionality set forth in part I, above, in order to create a professional-quality, custom publication. When the user first begins to edit an issue, for example, the user begins by selecting the level of customization the user desires while creating the magazine. For example, if the user selects "Professionally-Written Magazine," the user's template will be filled with timely, professional, general-interest StoryFile articles and content. The user can then delete content as necessary to make room for user-created content. If the user selects "Blank Magazine," the user's template is left entirely blank, with the exception of recurring content associated with the user's account. This selection is ideal for users with a great deal of content to provide for a current issue of the user's publication.

The user interface or "online editor" is adapted to make editing, proofing, and submitting a custom magazine by the user as easy as possible. In one embodiment, a page of the magazine is drawn on the screen using a thumbnail image representative of that particular page. The thumbnail image may show the content of the page, to the extent possible in a thumbnail image, or may simply depict the background art for a particular page. The user can then select a particular thumbnail image in order to edit the content on that page of the publication. The editing process may include pre-filled content, deleting pre-filled content, adding user-created content, adding or removing photographs or other images, or editing the magazine page in other ways. The user may select another page from the thumbnail navigation described above in order to choose a new page to edit.

Figure 9:
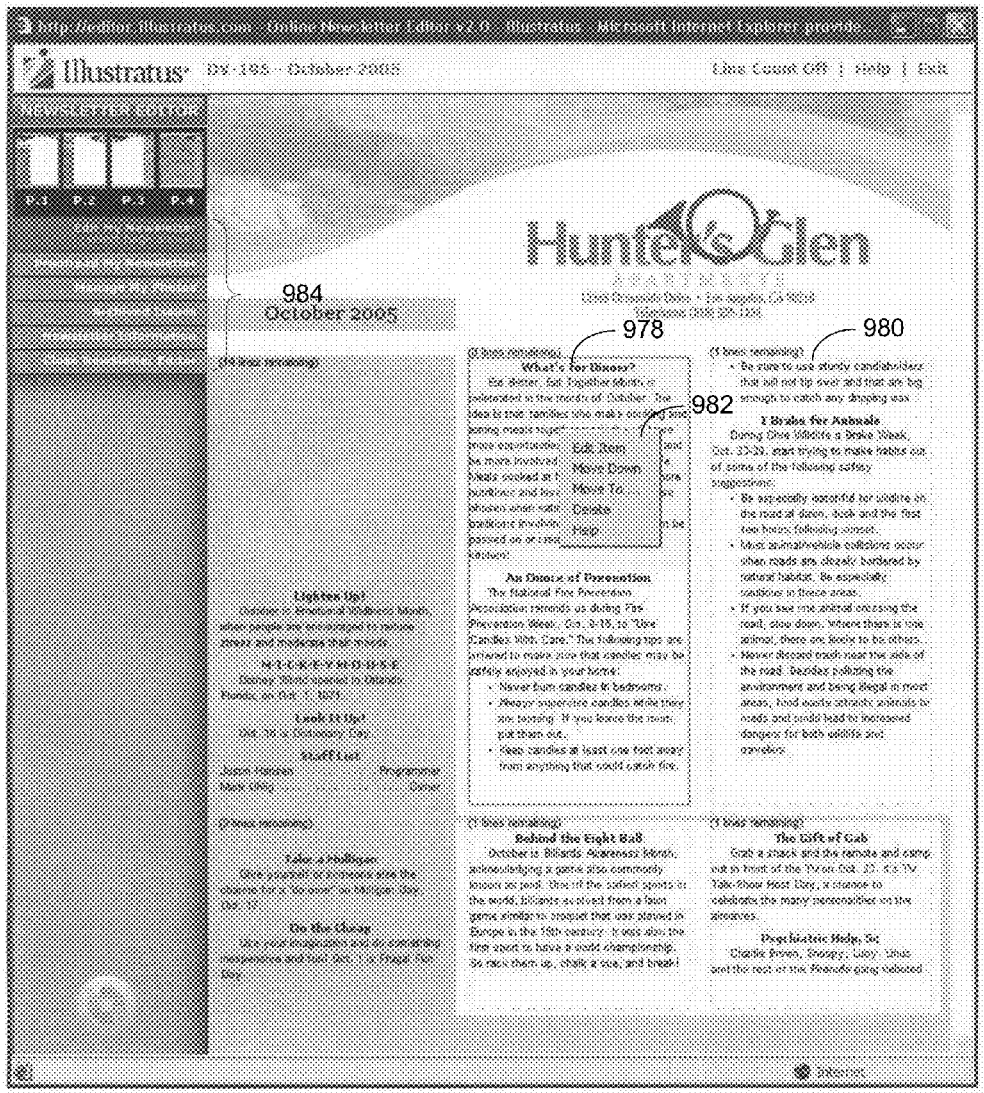
FIG. 9 illustrates a user interface of the editor, according to one embodiment of the invention.

FIG. 9 illustrates a user interface of the editor, according to one embodiment of the invention. Content for the page of the magazine being edited is provided in various sections, such as first section 978 and second section 980. In the embodiment shown in FIG. 9, first section 978 and second section 980 are linked such that content overflow from first section 978 moves ("flows") into second section 980. Content in first section 978 is highlighted, indicating that first section 978 has been selected by the user for editing. In one embodiment, the user can bring up a menu 982 by clicking on first section 978 with a mouse. Menu 982 provides the user with various commands, including "Edit Item," "Move Down," "Move To . . . ," "Delete," and "Help." It is contemplated that additional commands could also be provided by means of menu 982. In addition, navigation menu 984 provides the user with the ability to navigate to various steps in the magazine creation and editing process.

Figure 10:
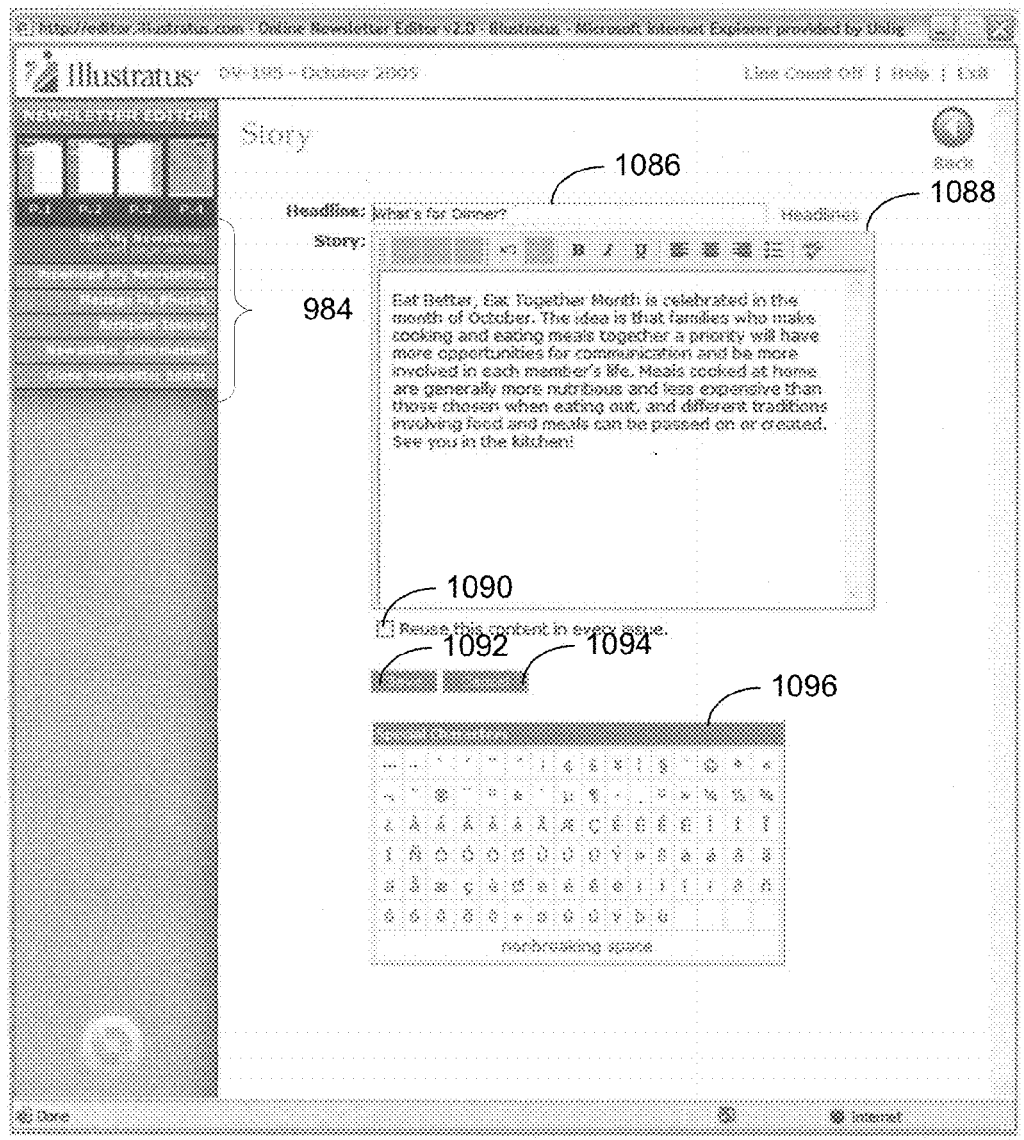
FIG. 10 illustrates a user interface of the editor to edit an item, according to one embodiment of the invention.

In one embodiment, if the user chooses the "Edit Item" command from menu 982 with respect to, for example, first section 978, the user is presented with a screen as shown in FIG. 10. FIG. 10 illustrates a user interface of the editor to edit an item, according to one embodiment of the invention. The Content Module being utilized provides the user with the ability to edit first section 978. The headline used with the content in first section 978, for example, is provided in text box 1086. The user can edit the headline, providing a headline of the user's own creation, or may search pre-approved headlines provided by the provider. The main content of first section 978 is the story, which is provided in editable form in text box 1088. The user can edit this content according to the user's own needs simply by typing or pasting text into text box 1088. Should the user desire to designate the contents of text boxes 1086 and 1088 as recurring content, the user may ensure that it is reused in every issue of the user's publication by checking checkbox 1090. Buttons 1092 and 1094 are provided so that the user can save edited content or cancel the changes made to the content, respectively. Special character box 1096 provides the user with a means to insert special characters into the story by merely clicking on the appropriate special character with the user's mouse. Thus, the user does need not be familiar with the HTML special codes for the various special characters. Navigation menu 984 is maintained in this screen as well, providing an ease of navigation for the user.

The view of the publication shown, for example, in FIG. 9, is referred to herein as the "Page View." As noted above, when the user of the present system moves a cursor over a section appearing on the computer screen, the color of the section outline changes (highlighting the section) to inform the user that the section is editable. The user may then customize the individual pages of the magazine by adding, editing, searching, and selecting content. In one embodiment, the "Page View" of the magazine is an interactive HTML/DHTML/JavaScript view of the magazine resembling the final product. Any suitable programming language may be used however, so long as the underlying required functionality as set forth herein is preserved.

Figure 11:
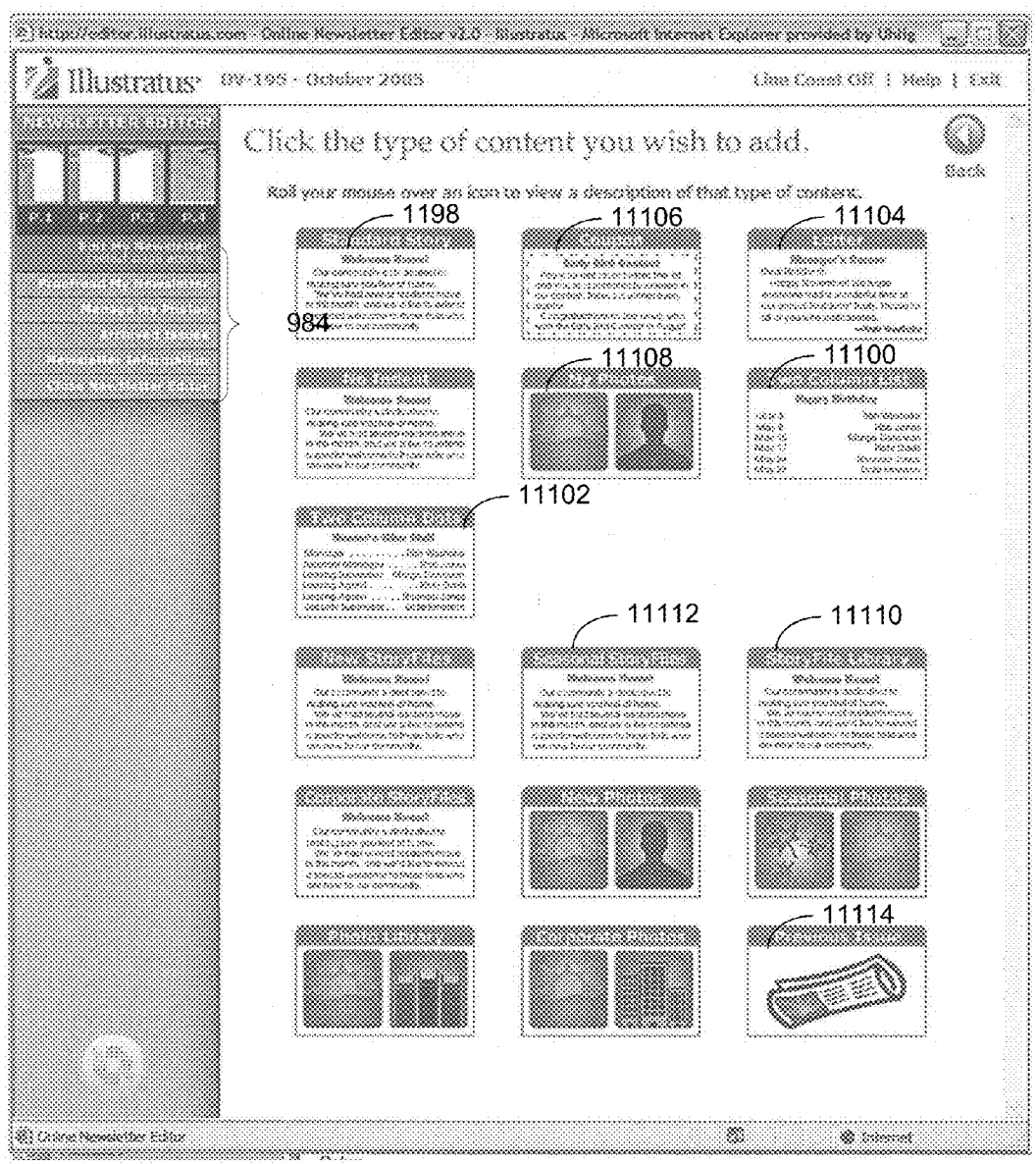
FIG. 11 illustrates a user interface of the editor to select a Content Module, according to one embodiment of the invention.

In one embodiment, when the user chooses to add content in the Page View (such as, for example, by selecting an "Add Content" function), the user is provided with a group of Content Modules to choose from (exemplary Content Modules being described more fully with respect to setup and configuration, above). FIG. 11 illustrates a user interface of the editor to select a Content Module, according to one embodiment of the invention. A user may select the Content Module the user wishes to use from, for example, Standard Story 1198, Two Column List 11100, Two Column Dots 11102, Letter 11104, Coupon 11106, and My Photos 11108. Further, in one embodiment, the user is provided with search options such as the ability to search, for example, StoryFile Library 11110, Seasonal StoryFiles 11112, or Previous Issue archive 11114. Selecting StoryFile Library 11110 allows the user to search the provider's StoryFile library for content the user wishes to include in a given issue of the magazine. The user is able to search StoryFile content by owner, keyword, or StoryFile code. It is contemplated that additional search options may also be provided. If the user selects Seasonal StoryFile 11112, StoryFile content for the current issue cycle is displayed, and the user may select from among the content displayed for incorporation into the user's magazine. If the user selects Previous Issue archive 11114, the user is presented with a list of previously used material, such as, for example, from the previous twelve issues of the user's publication. When the user then selects a previous issue of the publication, that issue is searched for content that is allowed to appear in the section being edited.

In one embodiment, when the user conducts a search for content, the Content Module will display the search results in the same width as the section being edited and notify the user as to how many lines the content will use within the section. The user can in that way determine whether the content is appropriate for the section being edited without having to first insert it and view it on the screen. Further, if the content is already in use in the same issue of the magazine, in one embodiment the Content Module "grays out" the content onscreen so that the user will not be able to select it. This protects the user from using the same content more than once in an individual issue of the user's publication. Once the user has decided on the appropriate content for a section, the user can select "insert," at which time the content is inserted into the section and the user is returned to the Page View. Alternatively, if the user selects the content itself, the present system may direct the user to a Content Module Form that allows the user to edit the contents of the Content Module prior to inserting it in the publication.

Figure 12:
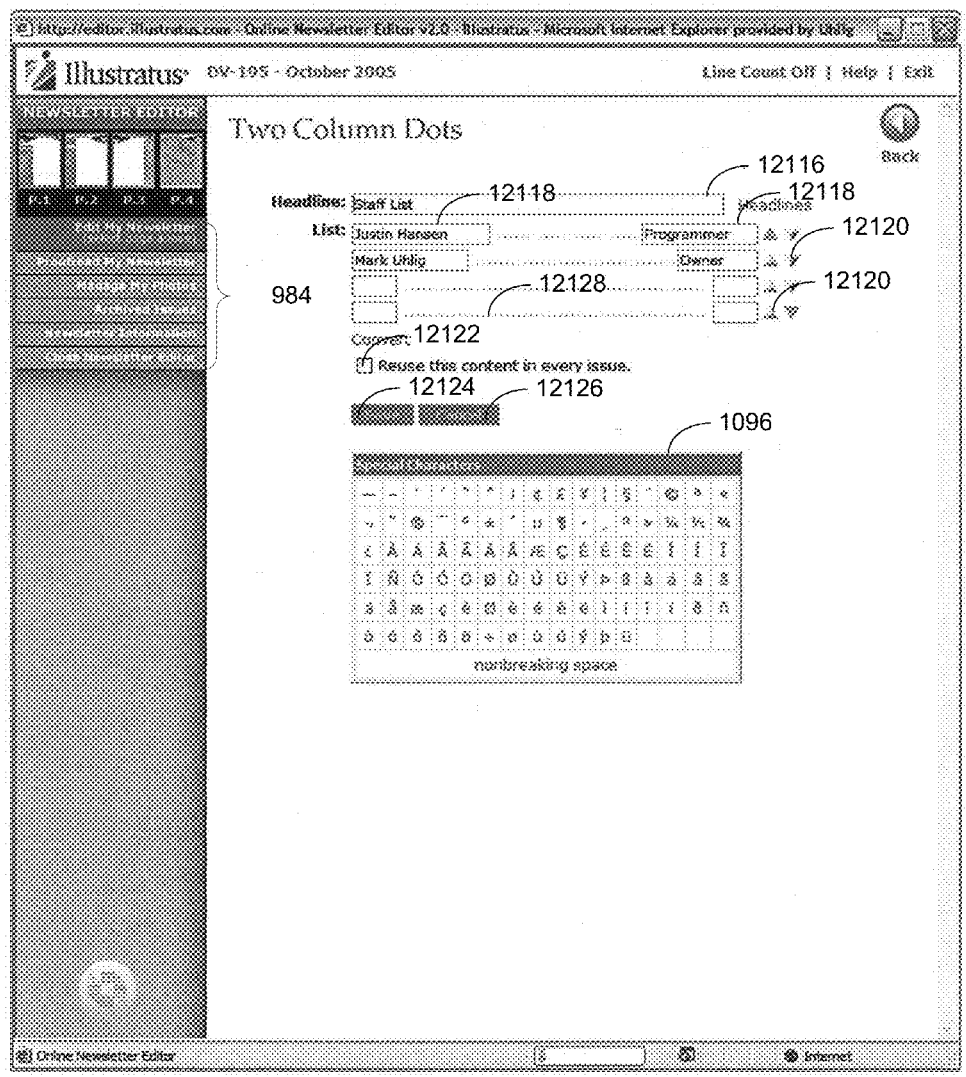
FIG. 12 illustrates a user interface of the editor to edit the contents of a Two Column Dots Content Module, according to one embodiment of the invention.

For example, if the user selects Two Column Dots 102 as the content module the user wishes to add to a section, then chooses to edit the contents of the Content Module, the user may be provided with a screen such as that depicted in FIG. 12. FIG. 12 illustrates a user interface of the editor to edit the contents of a Two Column Dots Content Module, according to one embodiment of the invention. As shown in FIG. 12, the user is provided with a text box 12116, representing the headline associated with the content. The user may edit the contents of text box 12116 according to the user's desires. The list itself is created from multiple text boxes 12118, into which the user may enter the desired content. As the user enters content into text boxes 12118, the present system automatically configures leader dots 12128 to provide the optimal number and distribution of dots between text boxes 12118. The user may also move content up and down along the list by use of arrows 12120. In the event that the user wishes to designate the Two Column Dots content as recurring content, the user is able to do so by checking checkbox 12122, in which case the content will appear in each issue of the user's publication. Buttons 12124 and 12126 are provided so that the user can save edited content or cancel the changes made to the content, respectively. Special Character Box 1096 is again provided so that the user will have access to special characters, and navigation menu 984 is provided for ease of navigation along various steps of the magazine creation process.

In instances where a section is configured for the Issue Content owner, and the Product/Fee setting (see description of the Templates in section I, above) has a value other than "none," in one embodiment the content element menu will include an option for the user to purchase the section. When a section is purchased, a fee for that section is automatically included with the user's invoice, and the Issue Content is removed from that section, allowing the user to edit the section. In one embodiment, at any point during the creation and editing process, the user is provided with an option to cancel the purchase of the magazine section, in which case the user-entered content will be removed and the issue content restored. In the event a section purchase is canceled, the present system will automatically remove the associated fee from the user's invoice.

Figure 13:
FIG. 13 illustrates a user interface of a My Photos library of images, according to one embodiment of the invention.

With respect to editing images or photographs included in a magazine being created by a user, the present method provides a number of options. In one embodiment, a user of the present method has an online library of images, referred to herein as "My Photos," available for use with the magazine. FIG. 13 illustrates a user interface of a My Photos library of images, according to one embodiment of the invention. A user can navigate the library for images that have been uploaded for use with her account, in one embodiment viewing the library of images as thumbnail images appearing onscreen. The user may upload additional images to the library, or may make changes to existing images within the user's "My Photos" library.

When a user chooses to upload an image to the "My Photos" library, the present system checks the image to determine whether it meets the minimum quality standards for use in a professional-quality magazine. If the image does not meet these standards, the user is notified that the image does not meet the appropriate standards and the image is not uploaded into the "My Photos" library. The standard may be set at, for example, 500 pixels in width. Any suitable setting may be used depending on the needs of a given publication. If the upload of the image is successful, a "Crop Thumbnail" view and a "My Photo" view of the image are both created by the system automatically.

If the user chooses to edit a photograph, the user selects a thumbnail of the desired photograph and moves into "My Photo" view. When an image is selected in "My Photo" view, the user is presented with multiple options for editing the image, including "crop," "rotate," "rename," and "delete."

The "crop" function allows the user to crop the image selected. In one embodiment, a crop thumbnail and cropping box are displayed. The cropping box inhibits the ability of the user to crop the image beyond a certain point, disallowing cropping an image to a width smaller than the minimum quality settings. In one embodiment, the cropping box does not restrict the height of the image. When the image is cropped, a copy of the original image is generated by the present system and the copy of the original image is cropped. The cropped image is then reprocessed as a new image.

The "rotate" function allows a user to rotate any image clockwise or counter-clockwise. In one embodiment, this function allows a ninety-degree rotation, though it is contemplated that any degree of rotation, or even free rotation about an axis, may be provided.

In one embodiment, while editing an image, the user is provided with "Rename" and "Delete" functions. The rename function allows the user to edit the label associated with a given image, while the delete function allows the user to remove the image from the My Photos display. In one embodiment, however, the delete function does not physically delete the file from the library, as it may have been previously used in another issue and will be necessary to preview or print any magazine in which it was used.

In one embodiment, menu 984 provides a user with the "Proofread My Magazine" option (shown as "Proofread My Newsletter"), which creates a PDF file of the current issue of the magazine for the user to view onscreen. In one embodiment, the proof copy looks identical to the hardcopy form of the final publication, with the exception of an added "proof" watermark to discourage distribution of the proof as an electronic document.

Upon completion of a magazine issue, the user may submit the magazine using the "Submit My Magazine" option from menu 984 (not shown). When the magazine is submitted, the present system validates the amount of content in the magazine. If there is too much content in the magazine, the system notifies the user of the excess content and does not allow the user to proceed with the submission process until the excess content is removed. Likewise, if there is too little content in the magazine, the user is notified of the lack of content in the magazine and given the option to add more content thereto. Alternatively, the user may be given the option of allowing the present system to automatically add Staff Written content to the magazine to make up for the lack of content.

In one embodiment, when the user submits the magazine, the user is allowed to review an invoice that has been automatically calculated based on the user's account settings and optional services that may have been selected during the magazine creation and editing process. In one embodiment, the user is presented with a submission agreement that the user must agree to prior to submitting the magazine.

APPENDIX C

Exemplary Business Application—Resale Documents

As used herein, the term "provider" refers generally to any individual or entity providing the present system as a service to users or subscribers thereto. As used herein, the term "user" refers to any individual or entities to whom a provider is providing the present system as a service.

In one embodiment, the resale documents business application 110 includes the following functionality: creation and configuration of company accounts, enrollment of registered users, design and creation of documents that are based on variable content and/or variable layout, scanning and storage of static documents, fulfillment of print orders for the finished product, and control of mailing the same.

In one embodiment, a web-based client/server application enables a user to access a publicly-facing website via a web browser (user client 140), where the user can log in to access the online resale document production system. A web server (web front-end 500), or host system, handles requests from the browser. The server-side components of the system process requests, store data, and store files. In one aspect of the present method described below, the server-side elements utilize the ColdFusion and Java programming languages for processing requests, an SQL server database for data storage, and a file server for file storage. It is contemplated, however, that any suitable programming languages, databases, or methods of file storage may be used without departing from the scope of the present invention.

The description below addresses the following steps: 1) account creation/configuration; 2) order placement; 3) notifications (optional); 4) deliverables processing; and 5) fulfillment.

Account creation/configuration is the process by which a user, in this case a residential property management company, establishes a company account with the provider and helps create a customized, branded web portal to access the present resale document ordering and creation system. Login to the web portal is made available only to clients of the property management company. Account creation may take place by any of a variety of methods currently known in the art. For example, a potential user (for the purposes of this exemplary system, a management company) may establish an account by phone, working with a representative of the provider to set up authorizations, passwords, and the like, and to provide user-identifying information to the provider. The representative of the provider may then manually set up and activate the company account. Company account creation would also include the enrollment of contacts, such as employees of the management company. These contacts would have different levels of access to the management company portal based on their differing levels of responsibilities and would be registered in an automated fashion during set-up of the management company account or configured manually, with the pertinent information needed to log on to and make use of the account provided to the management company.

As part of account configuration, the provider might also use the "logo" art and appropriate color schemes of the management company to create customized branded website portals—one for clients of the management company to use to access the web-based resale document ordering interface and one for management company employees to use for access to the interface where they manage and monitor the resale document order system online and provide data as required.

Configuration of a management company account would also include defining the business entities that will be served by the resale document system. In the exemplary system, these entities include: management company; homeowner association; community type; unit group; unit; unit type; location; and jurisdiction. Information to set up these entities might be received in an XML file provided by the user or entered by a user or a representative of the provider.

In addition, configuration of a management company account would also include configuring the various products and packages that would be available for registered users related to the specified management company. In this exemplary embodiment of the system, products include a resale documents bound book, a resale certificate, and/or a mortgage questionnaire. Packages are configured to establish the expediency of order turnaround (e.g., "Standard," or "Rush") and the pricing for each product.

Configuration would also take place for the various deliverables contained in each product that had been configured for the management company. Deliverables would contain both static documents and documents that are based on variable content and/or variable layout. Configuration of the dynamic documents would include the assignment of templates that output data that is specific to the unit or association. Such data (e.g., the resale certificate data with account balances or buyer and seller information) is either provided automatically by a web service or input by a user. Static documents (e.g., community bylaws, articles of incorporation, rules and regulations, etc.) would be scanned and stored electronically in the provider's resource library and attached to the unit, unit group, unit type, community type, association, location, management company, or jurisdiction in the database.

Order placement occurs when a registered user accesses the web-based resale document ordering interface to initiate the request for resale documents. To register, the user would provide contact information and create a password at the branded web portal, which the user might access through a hyperlink from the management company's main website.

Once registered and signed on, the user would enter the physical address of the property to verify that it is has been included in the provider database through the creation and configuration process. Once it has been established that the property has been enrolled with the provider (e.g., during configuration of the management company), the user would fill out a series of web-based forms regarding the sale or transfer of the property (e.g., name(s) of the seller(s), name(s) of the buyer(s), purchase price, and scheduled closing date). The user would select the appropriate product(s) and package(s), if applicable (only one option might be available), and then pay for the order via a variety of options while online: credit card, electronic check, a corporate account previously set up, or a coupon code generated by the provider and supplied to the user. In the alternative, the user could mail a paper check to the management company to pay for the order.

It is also possible that the order placement could be made over the phone or by mail, in which case a representative of the provider would enter the required information.

Notifications of the pending sale, if required (according to settings used to configure the management company account), could be sent via electronic mail to such entities as an inspector, a manager, the management company, or a title company. Various pieces of data pertaining to the designated property or approval of the sale (if required) would be provided by those entities until all information required to produce the requested resale documents had been compiled.

During this process, registered employees of the management company would also be able to access their user interface (also branded and customized) to view orders, approve orders (when required), and edit data to manage orders and track their progress.

Deliverables processing would begin once data for the order had been collected and payment was received. Each order could have one or many deliverables to produce, as electronic documents or physical documents or both. The deliverable would gather the required data (provided by a web-service or input by users) to produce the dynamic documents for the order. In addition, static documents (as specified in the configuration of the property) would be gathered to create a packet 130 to fulfill the order. Alternately, a packet to create a "proof" copy of the deliverables might be produced for approval before the actual packet was sent to fulfillment.

The deliverables for the order might include a Resale Certificate, which could include such pertinent information as the name of the current owner(s), the address of the property, the Homeowners Association to which the property is attached, any account balance the current owner(s) could have with the management company, Special Assessments or Maintenance Fees associated with the property, and when and to whom those fees might come due. In the alternative, the distribution utility could produce a PDF version of the Resale Certificate, which could then be sent via electronic mail or fax to the user.

The provider would use a comprehensive resource library of pre-scanned documents to produce the appropriate Homeowners Association documents requested in the order. These documents could include Homeowners Association Bylaws, Articles of Incorporation, Declarations, and Rules and Regulations. Triggered by the physical property address, the appropriate Homeowners Association documents could be compiled from the resource library database, along with pertinent variable information provided on the web-based interface or data retrieved externally from the web service, and converted by the distribution utility to produce a full-color, fully-customized perfect-bound book to be provided to the Buyer(s) before the closing of the sale of the residential home.

Thus, the present system provides a method for producing custom and unique publications that are of professional quality. The publications are produced by the user in a manner easy and intuitive for those with little design skills or computer expertise. Final documents are then processed and generated by the provider and the quality publications are sent to the user.

What is claimed is:

1. A method for modifying eXtensible Markup Language (XML) code that represents a document to be printed as a bound book, comprising:
    accessing the XML code, wherein the XML code comprises:
        a Cover XML element that represents a cover of the bound book and that includes a Front XML element that represents a front of the bound book, a Spine XML element that represents a spine of the bound book, and a Back XML element that represents a back of the bound book; and
        a Pages XML element that represents pages of the bound book and that includes multiple Page XML elements, each Page XML element representing a logical page of the bound book;
    identifying a physical page size that represents a physical sheet of material that will be used to print logical pages of the bound book;
    modifying the XML code by changing a position of a Page XML element within the XML code, such that each Page XML element in the modified XML code represents a physical page on which multiple logical pages will be printed
    identifying a maximum number of pages that are able to fit within one volume of the bound book;
    determining whether a number of Page XML elements in the XML code exceeds the maximum number; and
    responsive to the number of Page XML elements exceeding the maximum number, modifying the XML code by specifying an additional volume of the bound book.

2. The method of claim 1, wherein modifying the XML code implements the physical page size by specifying one or more physical pages.

3. The method of claim 1, further comprising determining a size of the spine of the bound book based on a number of Page XML elements in the XML code.

4. The method of claim 1, further comprising modifying the modified XML code by specifying a "cut" mark that indicates where to cut the physical sheet of material.

5. The method of claim 1, further comprising generating, based on the modified XML code, page description language content that represents the document to be printed as the bound book.

6. The method of claim 5, wherein the page description language content comprises PostScript.

7. The method of claim 5, wherein the page description language content comprises Portable Document Format.

8. The method of claim 5, wherein generating, based on the modified XML code, page description language content that represents the document to be printed as the bound book comprises:
    identifying, within the modified XML code, a portion that represents a piece of content to include in the bound book; and
    determining a height and a width of the piece of content.

9. The method of claim 5, wherein generating, based on the modified XML code, page description language content that represents the document to be printed as the bound book comprises:
    identifying, within the modified XML code, a portion that represents an image to include in the bound book; and
    determining a resolution of the image.

10. The method of claim 1, further comprising prior to modifying the XML code:
    identifying, within the XML code, a conditional logic portion that comprises an expression and data;
    determining a Boolean value of the expression;
    responsive to the determined value being "true", modifying the XML code by replacing the conditional logic portion with the data; and
    responsive to the determined value being "false", modifying the XML code by removing the conditional logic portion.

11. The method of claim 1, further comprising prior to modifying the XML code:
    identifying, within the XML code, a variable;
    determining a value of the variable; and
    modifying the XML code by replacing the variable with the determined value.

12. The method of claim 11, wherein the determined value comprises one element of a group containing document content information, XML code, an image, document layout information, and a template.

13. The method of claim 1, further comprising prior to modifying the XML code:
    identifying, within the XML code, content that is to be flowed;
    identifying, within the XML code, a template through which the identified content is to be flowed;
    determining whether the identified content fits within one instance of the identified template; and
    responsive to the identified content not fitting within one instance of the identified template, modifying the XML code by specifying an additional instance of the identified template.

14. The method of claim 13, further comprising responsive to the identified content not fitting within one instance of the identified template, modifying the XML code by specifying that the identified content will be placed within the additional instance of the identified template.

15. The method of claim 13, further comprising:
    identifying, within the XML code, a second set of content that is to be repeated when a flow occurs; and
    responsive to the identified content not fitting within one instance of the identified template, modifying the XML code by adding the identified second set of content.

16. A method for modifying eXtensible Markup Language (XML) code that represents a document to be printed as a bound book, comprising:
  accessing the XML code, wherein the XML code comprises:
    a Cover XML element that represents a cover of the bound book and that includes a Front XML element that represents a front of the bound book, a Spine XML element that represents a spine of the bound book, and a Back XML element that represents a back of the bound book; and
    a Pages XML element that represents pages of the bound book and that includes multiple Page XML elements, each Page XML element representing a logical page of the bound book;
  identifying, within the XML code, content that is to be flowed;
  identifying, within the XML code, a template through which the identified content is to be flowed;
  determining whether the identified content fits within one instance of the identified template;
  responsive to the identified content not fitting within one instance of the identified template, modifying the XML code by specifying an additional instance of the identified template;
  identifying a physical page size that represents a physical sheet of material that will be used to print logical pages of the bound book; and
  modifying the XML code by changing a position of a Page XML element within the XML code, such that each Page XML element in the modified XML code represents a physical page on which multiple logical pages will be printed.

17. The method of claim 16, wherein modifying the XML code implements the physical page size by specifying one or more physical pages.

18. The method of claim 16, wherein the steps further comprise modifying the modified XML code by specifying a "cut" mark that indicates where to cut the physical sheet of material.

19. A computer system for modifying eXtensible Markup Language (XML) code that represents a document to be printed as a bound book, the system comprising:
  a non-transitory computer-readable storage medium storing computer program modules executable to perform steps comprising:
    accessing the XML, code, wherein the XML, code comprises:
      a Cover XML element that represents a cover of the bound book and that includes a Front XML element that represents a front of the bound book, a Spine XML element that represents a spine of the bound book, and a Back XML element that represents a back of the bound book; and
      a Pages XML element that represents pages of the bound book and that includes multiple Page XML elements, each Page XML element representing a logical page of the bound book;
    identifying a physical page size that represents a physical sheet of material that will be used to print logical pages of the bound book; and
    modifying the XML code by changing a position of a Page XML element within the XML code, such that each Page XML element in the modified XML code represents a physical page on which multiple logical pages will be printed;
    identifying a maximum number of pages that are able to fit within one volume of the bound book;
    determining whether a number of Page XML elements in the XML code exceeds the maximum number; and
    responsive to the number of Page XML elements exceeding the maximum number, modifying the XML, code by specifying an additional volume of the bound book; and
  a computer processor for executing the computer program modules.

* * * * *